US011167215B2

(12) United States Patent
Nakano et al.

(10) Patent No.: US 11,167,215 B2
(45) Date of Patent: Nov. 9, 2021

(54) GAME SYSTEM, METHOD OF PROVIDING INFORMATION RELATED TO MATCH-UP GAME, AND METHOD OF EXECUTING MATCH-UP GAME

(71) Applicant: BANDAI NAMCO Entertainment Inc., Tokyo (JP)

(72) Inventors: Atsushi Nakano, Tokyo (JP); Sho Aita, Tokyo (JP); Yuki Mizuhori, Tokyo (JP)

(73) Assignee: BANDAI NAMCO Entertainment Inc., Tokyo (JP)

( * ) Notice: Subject to any disclaimer, the term of this patent is extended or adjusted under 35 U.S.C. 154(b) by 0 days.

(21) Appl. No.: 16/727,295

(22) Filed: Dec. 26, 2019

(65) Prior Publication Data

US 2020/0206638 A1 Jul. 2, 2020

(30) Foreign Application Priority Data

Dec. 27, 2018 (JP) .............................. JP2018-245687

(51) Int. Cl.
*A63F 13/795* (2014.01)
*A63F 13/35* (2014.01)

(52) U.S. Cl.
CPC ............ *A63F 13/795* (2014.09); *A63F 13/35* (2014.09)

(58) Field of Classification Search
CPC ........ A63F 13/75; A63F 13/35; A63F 13/795; A63F 2300/6653
USPC .......................................................... 463/42
See application file for complete search history.

(56) References Cited

U.S. PATENT DOCUMENTS

| | | | | |
|---|---|---|---|---|
| 2007/0218987 A1* | 9/2007 | Van Luchene | .......... | A63F 13/12 463/30 |
| 2008/0139318 A1* | 6/2008 | Van Luchene | .......... | A63F 13/12 463/42 |
| 2008/0254431 A1* | 10/2008 | Woolf | ...................... | G09B 5/00 434/322 |
| 2009/0017913 A1* | 1/2009 | Bell | ........................ | H04W 4/20 463/40 |
| 2010/0216542 A1* | 8/2010 | Van Luchene | .......... | A63F 13/75 463/25 |
| 2011/0102459 A1* | 5/2011 | Hall | ....................... | H04W 4/021 345/633 |
| 2012/0077599 A1* | 3/2012 | Van Luchene | .......... | A63F 13/75 463/42 |
| 2014/0087355 A1* | 3/2014 | Henry | ...................... | G09B 7/00 434/362 |
| 2014/0214506 A1* | 7/2014 | Van Luchene | ..... | G06Q 30/0209 705/14.12 |
| 2016/0294753 A1* | 10/2016 | Centner | ................... | H04L 51/12 |
| 2017/0148267 A1* | 5/2017 | Parker | .................... | G07F 17/323 |

(Continued)

FOREIGN PATENT DOCUMENTS

JP 2004-113355 A 4/2004

*Primary Examiner* — Michael A Cuff
(74) *Attorney, Agent, or Firm* — Posz Law Group, PLC

(57) ABSTRACT

A server determines, for each player, whether or not a sanction as a sanction target player is to be imposed based on a state or an action of an operation target player character of the player concerned. When it is determined that the sanction is to be imposed, sanction control processing is executed that provides a terminal owned by a player who differs from the sanction target player with player-related information of the sanction target player as the sanction.

15 Claims, 11 Drawing Sheets

TERMINAL 20 OF PLAYER B
(PRIOR TO EXECUTION OF SANCTION CONTROL PROCESSING)

TERMINAL 20 OF PLAYER B
(DURING SANCTION CONTROL PROCESSING)

(56) References Cited

U.S. PATENT DOCUMENTS

2017/0312632 A1* 11/2017 Curley .................. A63F 13/573
2018/0091594 A1* 3/2018 Borodiak ........... G06Q 30/0601
2020/0078688 A1* 3/2020 Kaethler ................ G06N 20/20
2020/0197811 A1* 6/2020 Eatedali ................ G06N 20/00

* cited by examiner

| IDENTIFICATION INFORMATION AFFILIATION INFORMATION | COORDINATE INFORMATION | STATE INFORMATION/ STATE HISTORY INFORMATION | CHARACTER INFORMATION | ACTION INFORMATION/ ACTION HISTORY INFORMATION | TEAM INFORMATION | BILLING INFORMATION | CHARACTERISTIC INFORMATION ATTRIBUTE INFORMATION | CAMERA INFORMATION |
|---|---|---|---|---|---|---|---|---|
| TARO 001 TEAM A | | | | | | | | |
| PLAYER A 002 TEAM B | | ... | ... | ... | ... | ... | ... | ... |
| ... | ... | ... | ... | ... | ... | ... | ... | ... |

FIG. 5

GAME SYSTEM, METHOD OF PROVIDING INFORMATION RELATED TO MATCH-UP GAME, AND METHOD OF EXECUTING MATCH-UP GAME

Japanese Patent Application No. 2018-245687, filed on Dec. 27, 2018, is hereby incorporated by reference in its entirety.

BACKGROUND OF THE INVENTION

The present invention relates to a game system, a method of providing information related to match-up game, and a method of executing match-up game.

Conventionally, action games and shooting games are known, including third-person shooting (TPS) games (third-person shooters) which enable a player to move freely inside a game world or a game space in a game or the like from a third-person perspective of following a player character and fight using a weapon or fight in hand-to-hand combat and first-person shooting (FPS) games (first-person shooters) which enable a player to move freely inside a game world or a game space in a game or the like from a perspective of a player character and fight using a weapon or fight in hand-to-hand combat.

In addition, among such games, there are also known battle royale games or roll playing games (Massively Multiplayer Online Role-Playing Games (MMORPGs)) in which a plurality of players or teams participate in a game world of a single game and whichever player or team has managed to continue the game the longest is recognized as a winner.

In such games, since confrontations between two players with a difference in skill always result in a victory for the player with the higher skill, there is a need for a game system which enables a heated and exciting game to be executed while eliminating such a difference in skill.

Meanwhile, among match-up games in which a player matches up against a plurality of enemy characters, match-up games are known in which an enemy character who has a key role in advancing the game is identified among the enemy characters and information such as a position of the enemy character is displayed (for example, JP-A-2004-113355).

However, in the game system described in JP-A-2004-113355, since information on an enemy character is merely provided and cannot be described as being presented in such a manner to intensify match-ups between players, in order to intensify match-ups between players through the use of presentation of such information, further ingenuity is required.

The invention has been made in order to solve the problem described above and an object thereof is to provide a game system or the like capable of invigorating a game by constructing an environment in which it is difficult to adopt a strategy of prolonging life by excessively avoiding match-ups in a match-up game and, consequently, improving an entertainment level of the game.

SUMMARY

According to a first aspect of the invention, there is provided a game system which executes a match-up game between players using a plurality of player characters in a game field formed in a virtual space and which provides a terminal with information related to the match-up game, the game system including a processor programmed to manage, during a game, player-related information which is related to each player and stored in a storage for each player and which at least includes either one of state information indicating a state and action information indicating an action during the game of a player character operated by each player;

execute, for each player or for each group constituted by a plurality of players, sanction determination processing of determining whether or not to impose a sanction as a sanction target player on the player based on at least either one of a state and an action of a determination target player character to be a determination target, the determination target player character being an operation target of the player concerned; and execute, when it is determined by the sanction determination processing that a sanction is to be imposed on the player who is a determination target as a sanction target player, sanction control processing of providing player-related information of the sanction target player to a terminal owned by a player who is not the sanction target player or to a terminal owned by a player who belongs to a group that differs from a group to which the sanction target player belongs as the sanction.

According to a second aspect of the invention, there is provided a method of executing a match-up game between players using a plurality of player characters in a game field formed in a virtual space and providing a terminal with information related to the match-up game, the method including:

managing, during a game, player-related information which is related to each player and stored in a storage for each player and which at least includes either one of state information indicating a state and action information indicating an action during the game of a player character operated by each player;

executing, for each player or for each group constituted by a plurality of players, sanction determination processing of determining whether or not to impose a sanction as a sanction target player on the player based on at least either one of a state and an action of a determination target player character to be a determination target, the determination target player character being an operation target of the player concerned; and executing, when it is determined by the sanction determination processing that a sanction is to be imposed on the player who is a determination target as a sanction target player, sanction control processing of providing player-related information of the sanction target player to a terminal owned by a player who is not the sanction target player or to a terminal owned by a player who belongs to a group that differs from a group to which the sanction target player belongs as the sanction.

According to a third aspect of the invention, there is provided a game system which executes a match-up game between players using a plurality of player characters in a game field formed in a virtual space, the game system including a processor programmed to manage, during a game, player-related information which is related to each player and stored in a storage for each player and which at least includes either one of state information indicating a state and action information indicating an action during the game of a player character operated by each player;

execute, for each player or for each group constituted by a plurality of players, sanction determination processing of determining whether or not to impose a sanction as a sanction target player on the player based on at least either one of a state and an action of a determination target player character to be a determination target, the determination target player character being an operation target of the player concerned; and display, when it is determined by the sanction determination processing that a sanction is to be imposed on the player who is a determination target as a sanction target player, player-related information of the sanction target player on display means used by another player as the sanction.

According to a fourth aspect of the invention, there is provided a method of executing a match-up game between players using a plurality of player characters in a game field formed in a virtual space, the method including:

managing, during a game, player-related information which is related to each player and stored in a storage for each player and which at least includes either one of state information indicating a state and action information indicating an action during the game of a player character operated by each player;

executing, for each player or for each group constituted by a plurality of players, sanction determination processing of determining whether or not to impose a sanction as a sanction target player on the player based on at least either one of a state and an action of a determination target player character to be a determination target, the determination target player character being an operation target of the player concerned; and displaying, when it is determined by the sanction determination processing that a sanction is to be imposed on the player who is a determination target as a sanction target player, player-related information of the sanction target player on display means used by another player as the sanction.

BRIEF DESCRIPTION OF THE SEVERAL VIEWS OF THE DRAWING

FIG. 5 is a diagram illustrating an example of player-related information stored in a player information storage unit according to an embodiment of the invention.

Figure 1:
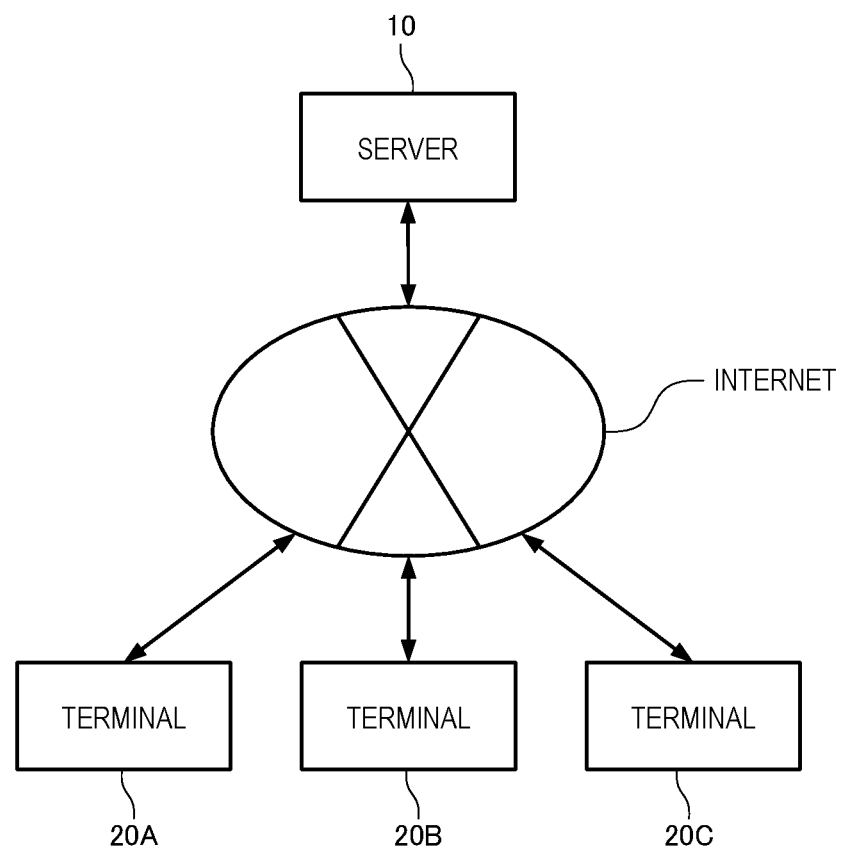
FIG. 1 is a diagram illustrating an example of a configuration representing a configuration of a game system according to an embodiment of the invention.

DETAILED DESCRIPTION OF THE EMBODIMENT (1) According to an embodiment of the invention, there is provided a game system which executes a match-up game between players using a plurality of player characters in a game field formed in a virtual space and which provides a terminal with information related to the match-up game, the game system including a processor programmed to manage, during a game, player-related information which is related to each player and stored in a storage for each player and which at least includes either one of state information indicating a state and action information indicating an action during the game of a player character operated by each player;

execute, for each player or for each group constituted by a plurality of players, sanction determination processing of determining whether or not to impose a sanction as a sanction target player on the player based on at least either one of a state and an action of a determination target player character to be a determination target, the determination target player character being an operation target of the player concerned; and execute, when it is determined by the sanction determination processing that a sanction is to be imposed on the player who is a determination target as a sanction target player, sanction control processing of providing player-related information of the sanction target player to a terminal owned by a player who is not the sanction target player or to a terminal owned by a player who belongs to a group that differs from a group to which the sanction target player belongs as the sanction.

For example, in a match-up game of which match-ups between players or groups (teams) are an important part such as survival games including battle royale games, with respect to a player who attempts to prolong life by excessively avoiding match-ups with other players, the game system described above is capable of exposing a current position or a state of a determination target player character of the player to other players as a penalty (a sanction).

In other words, since the game system described above is capable of constructing an environment in which it is difficult to adopt such a strategy of prolonging life by excessively avoiding match-ups with other players, the game can be invigorated and, as a result, an entertainment level of the game can be improved.

It should be noted that "player-related information" includes not only information on a current state of a player and a player character but also history information indicating a history or each piece of information and, for example, includes the following:

(A1) information (positional information) on coordinates in a virtual space and navigation information of a player character operated by a player, and an orientation of the player character;

(A2) state information indicating a state including past states and postures of a player character (including history information of the state (hereinafter, referred to as "state history information"));
(A3) character information related to equipment (items) and abilities of the player character (including information on types of the items which the player character is equipped with and a state in which the player character is equipped with the items);
(A4) action information including past and ongoing positions in a game space of a player character such as during preparation of equipment, during rest (including while asleep and during meals), and during match-ups, equipment used during match-ups, and an area through which the player character is moving (including information related to a history of the action (hereinafter, referred to as "action history information"));
(A5) information related to a same team as the player character such as the number and positions of player characters belonging to the same team (hereinafter, referred to as "team information");
(A6) information on in-game currency owned by the player character (hereinafter, referred to as "currency information"), and information related to an amount billed thus far and billing history (hereinafter, referred to as "billing information");
(A7) characteristic information indicating characteristics of a player character and attribute information indicating attributes of the player character; and
(A8) camera information such as an orientation of a virtual camera that visualizes a virtual space. However, in the following description, while "state information" or "action information" includes "state history information" or "action history information" in a broad sense, "state information" and "action information" are to be used as separate definitions in a narrow sense (in other words, when classified as current information or past information).

In addition, "sanction determination processing" includes performing the determination based on a given condition for imposing a sanction (hereinafter, also referred to as a "sanction condition") such as whether or not state information of a player character or action information of the player character includes information set in advance, whether or not a condition set in advance is fulfilled, or whether or not a quota set in advance is met.

In particular, for example, a "given sanction condition" includes the following:
(B1) a determination target player character has not engaged in an action set in advance related to a match-up between players such as not having inflicted any damage whatsoever on another player character or not having attacked another player character, or not having engaged in an attacking action within a predetermined period;
(B2) a determination target player character has not approached a vicinity (for example, within a radius of 5 m) of another player character within a predetermined period;
(B3) a determination target player character is not present or there is no trace of the determination target player character ever being present at an appearance-required point set in a game such as a food supply point or a checkpoint provided in a game space;
(B4) a certain state of a determination target player character such as a prostrated state of the determination target player character has continued for a certain period or longer;
(B5) a determination target player character has continuously engaged in a certain action or has not continuously engaged in a certain action such as not having moved within a game space for a certain period or longer;
(B6) a cumulative period during which an action set in advance has been performed within a certain period satisfies a defined condition; and
(B7) two or more among from (B1) to (B6) are applicable.

Furthermore, when executing the sanction determination processing per group,
(C1) the sanction determination processing may be applied based on an action or a state of a determination target player character of each player belonging to a group; or
(C2) respective determination results of each group may be tabulated, and a player belonging to the group (in other words, the entire group) may be determined as a sanction target player in accordance with a tabulation result thereof (for example, giving a predetermined number of points to each sanction target player and adding up the points for the entire group).

In particular, when (C2) tabulating determination results for each group to determine a sanction target player, the following may be determined as the sanction target player:
(C2-1) all players belonging to the group;
(C2-2) players (some players having a predetermined record such as a highest or a lowest record within the group);
(C2-3) a player having a greatest impact on a determination result; or
(C2-4) a player with lowest life energy.

Moreover, for example, "sanction control processing" not only includes providing other players with information related to a player such as a level of a sanction target player but also includes information related to a player character (in other words, a sanction target player character) operated by the sanction target player such as a position or a state of the player character or an item which the player character is equipped with.

In addition to the above, "providing player-related information of the sanction target player . . . to a terminal" preferably means, for example, information that causes the terminal to display the player-related information.

In particular, the player-related information may be always displayed on a terminal or may be displayed in different display modes such as a display period, a display interval (when repetitively displayed at predetermined time intervals), display characteristics (for example, a presence or absence of highlighting, or display size or display color) or the like in accordance with a level, a presence or absence of an item, characteristics, or a state (for example, a state of a player character of a sanction target player such as being in a state of mimicry or an unrecognizable state) of the sanction target player or a provision target player having been provided with the player-related information.

(2) In the game system described above,
the processor may be programmed to: determine, for each player or for each group, whether or not at least either one of a state and an action of a determination target player character to be a determination target of a player concerned satisfies a given sanction condition for imposing the sanction, and
determine to impose the sanction on a player who is a determination target when at least either one of a state and an action of the determination target player character satisfies the given sanction condition.

The game system described above can define, for example, a condition based on a state of a player character who is a determination target (including a period during which the state is maintained) or an action of the player character (including, for example, a past action history, the number of times the action was executed, or a location in a game space) as the sanction condition.

Therefore, since the game system described above enables criteria for invoking a sanction to be determined in detail, a player character who is excessively avoiding match-ups with other players can be accurately determined and a sanction can be accurately imposed on a determination target player who operates the player character.

(3) In the game system described above,
the given sanction condition may include a condition related to a period for detecting a state or an action of the determination target player character.

For example, the game system described above can determine whether or not a sanction is to be imposed using the condition related to a period by adopting a presence of a state where a determination target player character does not move for a certain period or the like as the sanction condition.

Therefore, since the game system described above enables a state or an action of a determination target player character to be more accurately specified, a player character who is excessively avoiding match-ups with other players can be accurately determined and a sanction can be accurately imposed on a determination target player who operates the player character.

Moreover, for example, "include a condition related to a period" includes the following:

(D1) a period during which a specific state defined by the sanction condition continues satisfies a defined condition such as a determination target player character being in a prostrated state or a state of mimicry for a certain period;
(D2) a period during which a specific action is maintained or a period during which a specific action is not maintained satisfies a defined condition such as a period during which an action related to attack is not taken with respect to another player (the period may include a period during which an attacking action is not taken such as preparation for sniping in addition to an actual attack such as sniping) or a period of no movement in a game space continues for a certain length or more; and
(D3) a period for detecting a timing at which a player character assumes a specific state or a timing at which the player character engages in a specific action as defined in a sanction condition satisfies a defined condition.

(4) In the game system described above,
the given sanction condition may include a condition defined based on coordinate information indicating coordinates in a virtual space of the determination target player character.

For example, the game system described above can determine whether or not a sanction is to be imposed using a condition defined based on coordinates in a game space such as a determination target player character not present in a vicinity of another player character in the game space.

Therefore, since the game system described above enables a state or an action of a determination target player character to be more accurately recognized, a player character who is excessively avoiding match-ups with other players can be accurately determined and a sanction can be accurately imposed on a determination target player who operates the player character.

Moreover, for example, "a condition defined based on coordinates in a virtual space" includes the following:

(E1) a determination target player character is not present in a vicinity (a 5 m-radius centered on an object character inside the game space) of another character such as a player character (including specific characters of specific players such as players with the highest records as well as a boss character); and
(E2) a determination target player character is not present or there is no trace of the determination target player character ever being present at an appearance-required point set in a game such as a food supply point or a checkpoint provided in a game space.

(5) In the game system described above,
the processor may be programmed to:
execute, when a sanction is imposed on the sanction target player, cancelling determination processing of determining whether or not at least either one of a state and an action after the sanction of a player character who is an operation target of the sanction target player satisfies a given cancelling condition, and
cancel, when a sanction is being imposed on the sanction target player and when it is determined by the cancelling determination processing that the given cancelling condition is satisfied, the sanction control processing being executed with respect to the sanction target player.

Since the game system described above enables a sanction imposed on a sanction target player to be canceled in accordance with a state or an action after the sanction of a player character of the sanction target player, the sanction target player can be restored from a disadvantageous state.

Therefore, the game system described above is capable of maintaining an entertainment level of a game without dampening a player's enthusiasm towards continuing the game even with respect to a sanction target player.

Moreover, for example, a "given cancelling condition" includes the following:

(F1) a sanction target player engages in a match-up with another player or wins the match-up;
(F2) a sanction target player comes into contact with another player such as by launching an attack on another player or coming under attack from another player;
(F3) when the sanction determination processing is repetitively executed every certain time, latest sanction determination processing indicates that a sanction condition is no longer satisfied; and
(F4) a position of a sanction target player character in a game space is continuously displayed in a display region of an item such as a radar or a map provided separately from the game space during a given period (for example, one minute) after invocation of a sanction condition.

(6) In the game system described above,
the processor may be programmed to:
cancel, when a sanction is being imposed on the sanction target player, sanction control processing being executed with respect to the sanction target player when a period set in advance passes from a start of the sanction.

Since the game system described above enables a sanction imposed on a sanction target player to be canceled once a certain period (for example, five minutes) passes after the sanction of a player character of the sanction target player, the sanction target player can be restored from a disadvantageous state.

Therefore, the game system described above is capable of maintaining an entertainment level of a game without dampening a player's enthusiasm towards continuing the game even with respect to a sanction target player.

Moreover, a sanction target player may be made aware of the given period by displaying a remaining time until cancelling of the sanction on a terminal of the sanction target player or a terminal providing player-related information.

(7) In the game system described above, the player-related information may include coordinate information that at least includes coordinates of a player character of the sanction target player in a virtual space or state information indicating a state of a player character of the sanction target player.

Since the game system described above is capable of providing information advantageous to other players in a match-up game such as a position of a player character of a sanction target player or a route to the position, state information indicating a state of the player character, and the like and imposing a sanction that gives a disadvantage to the sanction target player, each player can be prompted to avoid sanctions.

Therefore, since the game system described above enables operations and control for receiving a sanction to be avoided, consequently, a game can be invigorated and an entertainment level of the game can be improved.

Moreover, for example, in addition to information on coordinates of a sanction target player character, "coordinate information" includes the following:

(G1) information on an area of a virtual space divided in advance to which coordinates of the specific player character belong;

(G2) navigation information suggesting a route to coordinates of a specific player character or a direction of the coordinates from a position of a player character of a player concerned in a virtual space;

(G3) an orientation of a player character concerned and an orientation of a virtual camera that visualizes a virtual space; and (G4) information on past coordinates (for example, coordinates at a timing 10 seconds prior to a present time point) (current information is hidden so as to motivate a player character of a sanction target player to move instead of staying stationary at one spot and, at the same time, prevent other players from being provided with too much information).

Moreover, for example, "state information" includes the following:

(H1) information related to equipment which a player character is equipped with (including equipment used for attack, equipment for defense against attacks, equipment for supporting attack or defense, and equipment which enables the player character to be camouflaged into a background), capability of the equipment (including use conditions such as remaining ammunition), whether or not the equipment had been used when defeating another player character, a level of the equipment, a degree of proficiency (skill of handling) of the player character with respect to the equipment, and an expiration date of the equipment;

(H2) information related to a capability of a player character (a type of capability such as an attack level, a defense level, agility, magic, or supernatural powers);

(H3) information related to an attitude of a player character (a direction which the player character faces and a posture thereof) or a state of the player character (a wet state, a state of food shortage, or the like);

(H4) information related to a condition leading to a player character being defeated such as a stamina level of the player character; and (H5) information related to a status such as a level, a completion rate of tasks, or a record (the number of victories or the number of players defeated) of a player or a player character.

(8) In the game system described above, the player-related information may include:

(I1) action history-related information at least including action history information indicating a history of actions of a player character of the sanction target player; or (I2) action prediction-related information at least including action prediction information of the player character having been analyzed based on the action history information.

Since the game system described above is capable of providing information advantageous to other players when the players devise a strategy in a match-up game and imposing a sanction that gives a disadvantage to the sanction target player, each player can be prompted to avoid sanctions.

Therefore, since the game system described above enables operations and control for receiving a sanction to be avoided, consequently, a game can be invigorated and an entertainment level of the game can be improved.

It should be noted that "action history-related information" and "action prediction-related information" include information with respect to player characters of other players based on action history information or action prediction information such as a method of approach, a method of attack, or a method of escape with respect to a player character of a sanction target player.

In addition, while "at least including action history information" and "at least including action prediction information" indicate, as a minimum, only the action history information or the action prediction information may be included, other information may be included as well.

(9) In the game system described above, when the determination target player character is in an unrecognizable state where the determination target player character cannot be recognized by other players or the determination target player character is in a camouflaged state where the determination target player character is camouflaged as a given object in the virtual space and when player operating the determination target player character is the sanction target player, the player-related information may include information for displaying a disabled state where the unrecognizable state or the camouflaged state of the determination target player character has been disabled.

Since the game system described above is capable of providing information advantageous to other players in a match-up game such as a position of a player character of a sanction target player and imposing a sanction that gives a disadvantage to the sanction target player, each player can be prompted to avoid sanctions.

Therefore, since the game system described above enables operations and control for receiving a sanction to be avoided, consequently, a game can be invigorated and an entertainment level of the game can be improved.

Moreover, for example, an "unrecognizable state" indicates a state where a specific player character is in hiding so as to be unrecognizable from other players using an object formed in a virtual space such as hiding behind an object of a building.

In addition, a "camouflaged state" indicates a state where an outward appearance or an external shape of a specific player character is constituted by a same color (including similar colors) or a same tinge as each object among grass, a mountain area, a forest area, an urban area, an ocean, a river, or a lake, an architectural structure such as a building, and a mobile body such as an automobile or a train so that the specific player character blends into the surrounding scenery.

Furthermore, for example, "providing . . . information for displaying a disabled state" includes the following:

(J1) visualizing, so as to be recognizable, a specific player character who is in an unrecognizable state of being unrecognizable by other players or a camouflaged state by displaying an object present between the specific player character in hiding and a player character of a provision target player of player-related information as a transparent object, by highlighting an outward appearance or an external shape of the camouflaged state, or the like; and (J2) displaying a position of a specific player character in an unrecognizable state or a camouflaged state on a terminal using an arrow or a text.

(10) In the game system described above, the processor may be programmed to:

provide the terminal with, when the player character of the sanction target player is to be visualized on the terminal concerned, special display control information for specially displaying the player character together with the player-related information.

Since the game system described above is capable of providing information advantageous to other players and imposing a sanction that gives a disadvantage to the sanction target player, each player can be prompted to avoid sanctions.

Therefore, since the game system described above enables operations and control for receiving a sanction to be avoided, consequently, a game can be invigorated and an entertainment level of the game can be improved.

Moreover, "special display" includes specially displaying (aim-assisting) player-related information or improving accuracy of the aim-assist in a visualized game space particularly when a player character of a sanction target player of which player-related information should be displayed is captured within a field of view of a player character of a provision target player to which the player-related information has been provided (in other words, when the player character of the sanction target player is present within a game space as viewed from a virtual camera when the virtual camera is arranged at a perspective of the player character of the provision target player).

For example, "special display" indicates the following:

(K1) display the specific player character in a changed display size (for example, five times a normal size) at a position where the specific player character is present in a main screen on which the game space has been visualized; or (K2) create a new window at a position where the specific player character is present in a main screen and display (zoom-display) an enlargement of the specific player character having a required size or a part of the specific player character inside the window.

(11) In the game system described above, the special display control information may include operation control information for improving operability of a player provided with the special display control information for performing a match-up with the specially-displayed player character when the specially-displayed player character has been selected.

For example, when attacking the specially-displayed player character, the game system described above can improve operability when executing an attack on the player character.

Therefore, since the game system described above is capable of imposing a sanction that gives a disadvantage to the sanction target player, each player can be prompted to avoid sanctions and to avoid operations and control for receiving a sanction.

As a result, the game system described above can invigorate a game and improve an entertainment level of the game.

Moreover, for example, "operation control information for improving operability of a player" includes the following:

(L1) control information for automatically locking-on to a specially displayed player character as a target;

(L2) control information for enlarging a determination area of a hit check (whether or not an attack has hit a target) than normal when launching an attack on the specially displayed player character; or (L3) control information for controlling a physical behavior in a game space so that, in the case of an attack using a weapon, a hit probability of a mobile body for attacking a sanction target player character such as a homing projectile is increased.

(12) In the game system described above, the processor may be programmed to provide a terminal concerned with display change control information for changing a display mode in which the provided player-related information is to be displayed, together with the player-related information, in accordance with information included in player-related information of a sanction target player or a provision target player to which the player-related information has been provided.

The game system described above is capable of providing player-related information in different display modes such as a display period, a display interval (when repetitively displayed at predetermined time intervals), display characteristics (for example, a presence or absence of highlighting, or display size or display color) or the like in accordance with a level or the like of a sanction target player or a provision target player.

Therefore, the game system described above is capable of introducing a game element even into performing display as a sanction such as always displaying player-related information related to a high-level sanction target player but only sporadically displaying (only 15 seconds for every three minutes) player-related information related to a low-level sanction target player and, consequently, improving an entertainment level of the game.

Moreover, for example, "information included in player-related information of a sanction target player or a provision target player" includes the following:

(M1) a level of a player;

(M2) an item in the possession of a player;

(M3) characteristics or attributes of a player; and (M4) a state of a player character of a player (in particular, a state of a player character of a sanction target player in a state of mimicry, an unrecognizable state, or the like).

(13) According to an embodiment of the invention, there is provides a method of executing a match-up game between players using a plurality of player characters in a game field formed in a virtual space and providing a terminal with information related to the match-up game, the method including:

managing, during a game, player-related information which is related to each player and stored in a storage for each player and which includes at least either one of state information indicating a state and action information indicating an action during the game of a player character operated by each player;

executing, for each player or for each group constituted by a plurality of players, sanction determination processing of determining whether or not to impose a sanction as a sanction target player on the player based on at least either one of a state and an action of a determination target player character to be a determination target, the determination target player character being an operation target of the player concerned; and executing, when it is determined by the sanction determination processing that a sanction is to be imposed on the player who is a determination target as a sanction target player, sanction control processing of providing player-related information of the sanction target player to a terminal owned by a player who is not the sanction target player or to a terminal owned by a player who belongs to a group that differs from a group to which the sanction target player belongs as the sanction.

Since the method described above is capable of constructing an environment in which it is difficult to adopt a strategy of prolonging life by excessively avoiding match-ups with other players, the game can be invigorated and, as a result, an entertainment level of the game can be improved.

(14) According to an embodiment of the invention, there is provided a game system which executes a match-up game between players using a plurality of player characters in a game field formed in a virtual space, the game system including a processor programmed to: configured to:

manage, during a game, player-related information which is related to each player and stored in a storage for each player and which includes at least either one of state information indicating a state and action information indicating an action during the game of a player character operated by each player;

execute, for each player or for each group constituted by a plurality of players, sanction determination processing of determining whether or not to impose a sanction as a sanction target player on the player based on at least either one of a state and an action of a determination target player character to be a determination target, the determination target player character being an operation target of the player concerned; and display, when it is determined by the sanction determination processing that a sanction is to be imposed on the player who is a determination target as a sanction target player, player-related information of the sanction target player on display means used by another player as the sanction.

Since the game system described above is capable of constructing an environment in which it is difficult to adopt a strategy of prolonging life by excessively avoiding match-ups with other players, the game can be invigorated and, as a result, an entertainment level of the game can be improved.

(15) According to an embodiment of the invention, there is provided a method of executing a match-up game between players using a plurality of player characters in a game field formed in a virtual space, the method including:

managing, during a game, player-related information which is related to each player and stored in a storage for each player and which at least includes either one of state information indicating a state and action information indicating an action during the game of a player character operated by each player;

executing, for each player or for each group constituted by a plurality of players, sanction determination processing of determining whether or not to impose a sanction as a sanction target player on the player based on at least either one of a state and an action of a determination target player character to be a determination target, the determination target player character being an operation target of the player concerned; and providing, when it is determined by the sanction determination processing that a sanction is to be imposed on the player who is a determination target as a sanction target player, player-related information of the sanction target player on display means used by another player as the sanction.

Since the method described above is capable of constructing an environment in which it is difficult to adopt a strategy of prolonging life by excessively avoiding match-ups with other players, the game can be invigorated and, as a result, an entertainment level of the game can be improved.

Embodiments of the invention will be described below. It is to be understood that the embodiments described below are not intended to unduly limit the scope of the invention as set forth in the claims. It is also to be understood that all of the components described in the following embodiments are not necessarily essential requirements of the invention.

1. Game System

First, an overview and a general configuration of a game system 1 according to an embodiment of the invention will be described with reference to FIG. 1. FIG. 1 is a diagram illustrating an example of a system configuration representing a configuration of the game system 1.

In the game system 1, as illustrated in FIG. 1, a server 10 which provides a game service and a terminal 20 (for example, terminals 20A, 20B, and 20C) are configured to be connectable to the Internet (an example of a network).

By accessing the server 10 from the terminal 20, a user can play a game being transmitted from the server 10 via the Internet. Furthermore, by accessing the server 10 from the terminal 20, the user can communicate with other users.

The server 10 is an information processing apparatus capable of providing a service that enables users to play a game using the terminal 20 connected to the server 10 via the Internet so as to be capable of communicating with the server 10. In addition, the server 10 may function as an SNS server which provides a communication-type service. In this case, an SNS server may be an information processing apparatus which provides a service that enables a plurality of users to communicate with each other.

Furthermore, for example, when the server 10 functions as an SNS server, the server 10 is capable of providing a game referred to as a social game which is executed using an operating environment (an application programming interface (API), a platform, or the like) of the SNS to be provided.

In particular, the server 10 is capable of providing games provided on a web browser of the terminal 20 including browser games (games which start by simply opening an installation site with a web browser) created in various languages such as HTML, FLASH, CGI, PHP, shockwave, a Java (registered trademark) applet, and JavaScript (registered trademark).

Social games differ from existing online games in that dedicated client software is not required, and include games that can be played with only a web browser and an SNS account. In addition, the server 10 is configured to be capable of being connected to a terminal (a smart phone, a personal computer, a game device, or the like) of another user via a network and providing an online game which enables a same game progress to be simultaneously shared online.

Meanwhile, the server 10 may be constituted by one (apparatus or processor) or a plurality of (apparatuses or processors).

In addition, information such as billing information and game information stored in a storage area (a storage unit 140 to be described later) of the server 10 may be stored in a database (a storage apparatus or a memory in a broad sense) connected via a network (an intranet or the Internet) or, when the server 10 functions as an SNS server, information such as a player information storage unit 146 stored in the storage area may be stored in a database (a storage apparatus or a memory in a broad sense) connected via a network (an intranet or the Internet).

Specifically, the server 10 is configured to receive input information based on an operation by a user (in other words, a player executing a game) of the terminal 20 and to perform game processing based on the received input information. In addition, the server 10 is configured to transmit a game processing result to the terminal 20, and the terminal 20 is configured to perform various processing so as to provide the game processing result received from the server 10 on the terminal 20 so as to be viewable for the user.

The terminal 20 is an information processing apparatus such as an image generating apparatus including a smart phone, a mobile phone, a PHS, a computer, a game apparatus, a PDA, and a mobile game device, and is capable of being connected to the server 10 via a network such as the Internet (a WAN) or a LAN. A communication line between the terminal 20 and the server 10 may be either wired or wireless.

In addition, the terminal 20 is provided with a web browser capable of viewing web pages (data in an HTML format). In other words, the terminal 20 is equipped with a communication control function for communicating with the server 10, a web browser function for performing display control using data (web data, data created in the HTML format, and the like) received from the server 10 and transmitting data of a user's operation to the server 10, and the like, and is configured to execute various processing in order to provide the user with a game screen and enable the user to execute a game. However, the terminal 20 may acquire game control information provided by the server 10 and execute predetermined game processing, and execute a game based on the game processing.

Specifically, when the terminal 20 makes a request to perform a predetermined game to the server 10, the terminal 20 is connected to a game site of the server 10 and a game is started. In particular, by using an API as necessary, the terminal 20 is configured to cause the server 10 functioning as an SNS server to perform predetermined processing or acquire the player information storage unit 146 managed by the server 10 functioning as an SNS server to execute a game.

2. Server

Figure 2:
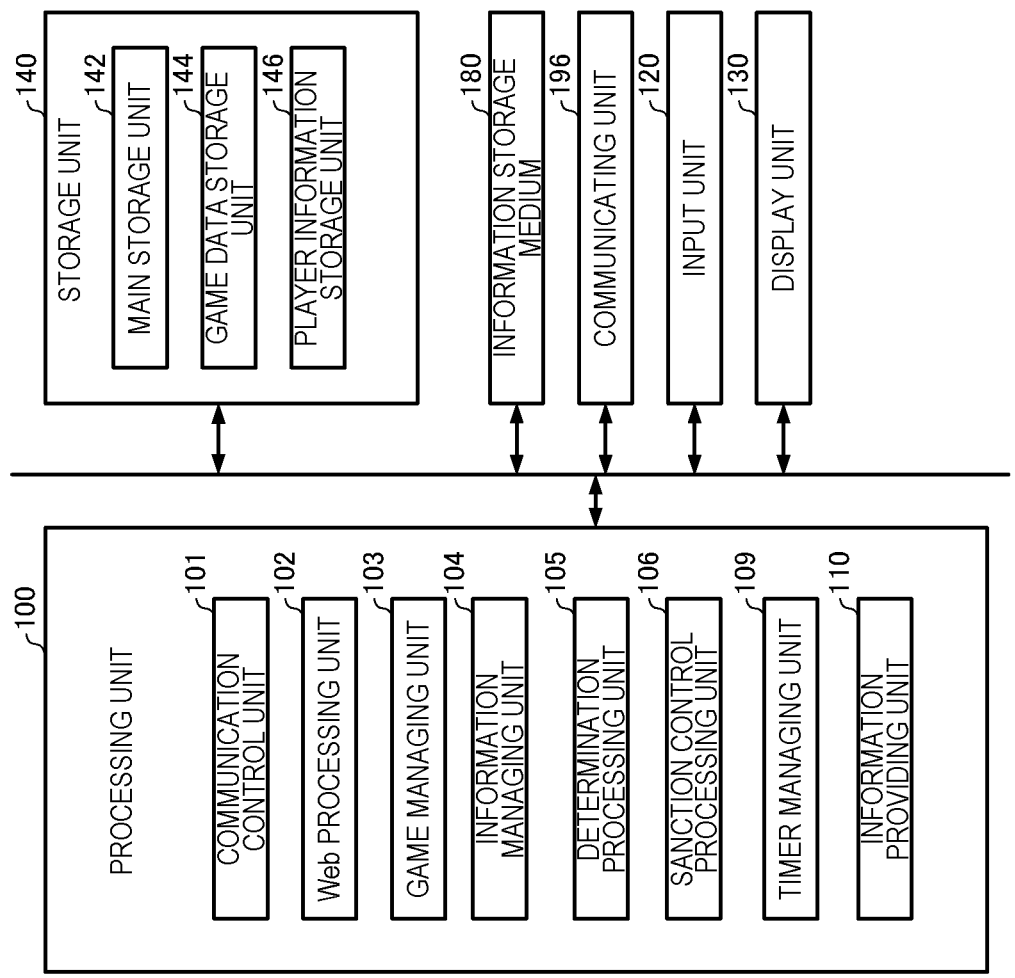
FIG. 2 is a diagram illustrating functional blocks of a server according to an embodiment of the invention.

Next, the server 10 will be described with reference to FIG. 2. Moreover, FIG. 2 is a diagram illustrating functional blocks of the server 10. Alternatively, the server 10 may be configured by omitting a part of the components (units) illustrated in FIG. 2.

The server 10 includes an input unit 120 used by an administrator or the like for input, a display unit 130 which performs predetermined display, an information storage medium 180 storing predetermined information, a communicating unit 196 for communicating with the terminal 20 and the like, a processing unit 100 which executes processing mainly related to a game to be provided, and the storage unit 140 storing a variety of data mainly used in the game.

The input unit 120 is used by a system administrator and the like to input settings related to a game and other necessary settings and to input data. For example, the input unit 120 is constituted by a mouse, a keyboard, or the like.

The display unit 130 is for displaying an operation screen for the system administrator. For example, the display unit 130 is constituted by a liquid crystal display or the like.

The information storage medium 180 (a computer-readable medium) stores a program, data, and the like, and a function of the information storage medium 180 is constituted by an optical disk (a CD or a DVD), a magneto-optical disk (MO), a magnetic disk, a hard disk, a magnetic tape, a memory (a ROM), or the like.

The communicating unit 196 performs various control for communicating with the outside (for example, a terminal, another server, or another network system), and a function of the communicating unit 196 is constituted by various processors, hardware such as a communication ASIC, a program, or the like.

The storage unit 140 serves as a work area for the processing unit 100, the communicating unit 196, and the like, and a function of the storage unit 140 is constituted by a RAM (VRAM) or the like. Moreover, information stored in the storage unit 140 may be managed by a database. In addition, the storage unit 140 constitutes storage means.

Furthermore, in addition to a main storage unit 142, the storage unit 140 has a game data storage unit 144 which stores game information indicating information related to a game and the player information storage unit 146 which stores player information indicating information related to each player and information related to the game of a player (hereinafter, referred to as "player-related information").

In particular, the game data storage unit 144 stores information on a game field where the game is carried out, condition information used to make various determinations, information on each object on the game field, information for changing each object, various table information, information related to a player character of each player, and the like.

In addition, the player information storage unit 146 stores, for each player, player-related information such as positional information in association with identification information such as a nickname or a player ID of the player and, when the player belongs to a team, a team name or an ID of the team to which the player belongs (hereinafter, referred to as "affiliation information").

The processing unit 100 performs a variety of processing using the main storage unit 142 inside the storage unit 140 as a work area. Functions of the processing unit 100 can be realized by hardware such as various processors (a CPU, DSP, or the like) and an ASIC (a gate array or the like) or by programs.

The processing unit 100 performs various processes according to the embodiment described above based on the program (data) stored in the information storage medium 180. In other words, the information storage medium 180 stores a program that causes a computer to function as each unit (a program which causes a computer to execute processing of each unit) of the embodiment described above.

For example, the processing unit 100 (processor) performs, based on a program stored in the information storage medium, overall control of the server 10 as well as a variety of processing including control of delivery of data and the like between the respective units. Furthermore, the processing unit 100 performs processing for providing various services in response to a request from the terminal 20.

Specifically, the processing unit 100 at least includes a communication control unit 101, a web processing unit 102, a game managing unit 103, an information managing unit 104, a determination processing unit 105, sanction control processing unit 106, a timer managing unit 109, and an information providing unit 110.

Moreover, the information managing unit 104 constitutes information managing means and the determination processing unit 105 constitutes determination processing means. In addition, for example, the sanction control processing unit 106 constitutes sanction control means together with the information providing unit 110.

The communication control unit 101 performs processing for transmitting and receiving data to and from the terminal 20 via the network. In other words, the server 10 performs a variety of processing based on information received by the communication control unit 101 from the terminal 20 and the like. In particular, the communication control unit 101 performs processing for transmitting, based on a request from the terminal 20 of a player, a game screen to the terminal 20 of the player.

The web processing unit 102 functions as a web server. For example, the web processing unit 102 performs, through a communication protocol such as Hypertext Transfer Protocol (HTTP), processing for transmitting data in response to a request by a web browser 211 installed on the terminal 20 and processing for receiving data transmitted by the web browser 211 of the terminal 20.

Moreover, while a case where the server 10 is also provided with a function as an SNS server will be described as an example according to the embodiment described above, the server 10 may be separately formed as a game server and a server for SNS. In addition, the server 10 may perform a part of or all of processing of a game according to the embodiment described above or the terminal 20 may perform a part of the processing of the game according to the embodiment described above.

The game managing unit 103 constructs a game space as a virtual space in conjunction with the terminal 20, and based on an operation by a player input via the terminal 20, executes various kinds of game processing related to an action game, a shooting game, a roll playing game (RPG), and a match-up game with respect to each player.

The information managing unit 104 manages player-related information related to each player which is stored in the player information storage unit 146 for each player during a game.

The determination processing unit 105 executes, for each player or for each group constituted by a plurality of players, sanction determination processing of determining whether or not to impose a sanction as a sanction target player on a player concerned based on at least either one of a state and an action of a player character to be a determination target (hereinafter, referred to as a "determination target player character"), the determination target player character being an operation target of a player concerned (hereinafter, referred to as an "operation target player character").

In addition, the determination processing unit 105 executes, when a sanction is imposed on a sanction target player, cancelling determination processing of determining whether or not at least either one of a state and an action after the sanction of a player character who is an operation target of the sanction target player (hereinafter, referred to as a "sanction target player character") satisfies a given cancelling condition.

The sanction control processing unit 106 executes, when it is determined by the sanction determination processing that a sanction is to be imposed on a player who is a determination target (hereinafter, referred to as a "determination target player") as a sanction target player, sanction control processing of providing, in conjunction with the information providing unit 110, a terminal 20 owned by a player who differs from the sanction target player or a terminal 20 owned by a player who belongs to a group that differs from a group to which the sanction target player belongs with player-related information of the sanction target player as the sanction.

The information providing unit 110 generates various kinds of game information that enables a terminal 20 to process a game and provides the terminal 20 concerned with the generated game information.

Specifically, the information providing unit 110 generates information (in other words, game information) that enables an target player character of each player to be controlled by a terminal 20 concerned and provides the terminal 20 concerned with the generated game information.

In particular, the information providing unit 110 executes, in conjunction with the sanction control processing unit 106, control for associating player-related information stored in association with a sanction target player with identification information for distinguishing the sanction target player from other players, and causing the terminal 20 of a player concerned to display the associated player-related information.

3. Terminal

Figure 3:
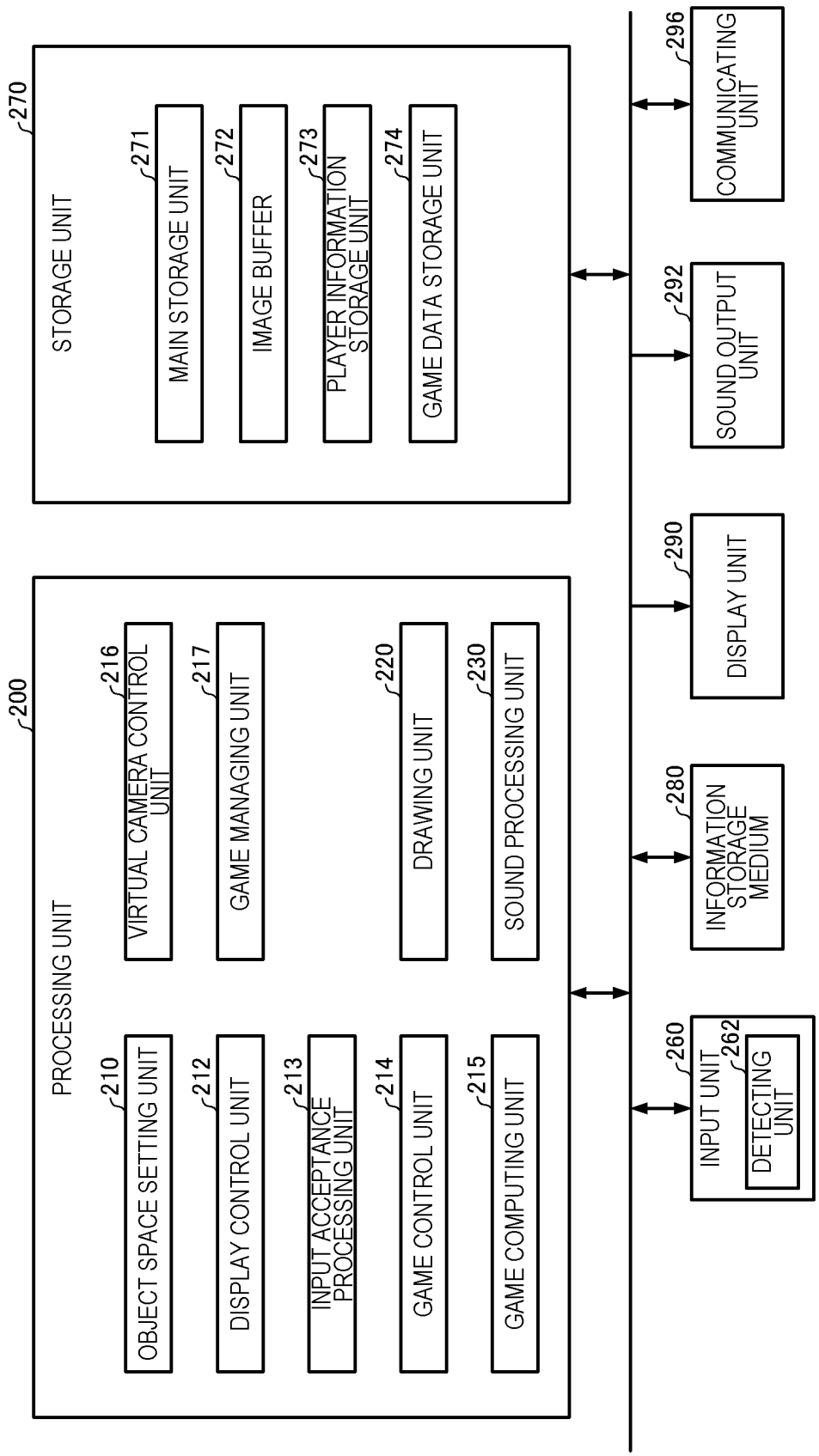
FIG. 3 is a diagram illustrating functional blocks of a terminal according to an embodiment of the invention.

Next, the terminal 20 will be described with reference to FIG. 3. Moreover, FIG. 3 is an example of a functional block diagram illustrating a configuration of the terminal 20. Alternatively, the terminal 20 may be configured by omitting a part of the components (units) illustrated in FIG. 3.

An input unit 260 is used by a player to input operation data, and a function thereof can be realized by a touch panel, a touch panel-type display, or the like. Specifically, the input unit 260 has a detecting unit 262 capable of detecting a two-dimensional instruction position coordinates (x, y) on a screen on which an image is to be displayed. For example, the input unit 260 has the detecting unit 262 capable of detecting two-dimensional contact position coordinates (x, y) in a contact detection region (a touch panel).

It should be noted that a contact operation on a display screen (hereinafter, referred to as a "touch panel" except in special circumstances) 12 may be configured to be performed using a fingertip or performed using an input device such as a stylus.

In addition, the input unit 260 may include a button or a lever, a keyboard, a steering wheel, a microphone, an acceleration sensor, or the like which enables operation information (an operation signal) other than an instruction position to be input.

A storage unit 270 serves as a work area for the processing unit 200, a communicating unit 296, and the like, and a function of the storage unit 270 can be realized by a RAM (VRAM) or the like. In addition, the storage unit 270 includes a main storage unit 271 to be used as a work area, an image buffer 272 for storing a final display image and the like, user information 273 indicating information related to a user as a player with respect to a provided game, and a game data storage unit 274 for storing various kinds of data necessary for executing the game such as table data. Alternatively, a configuration that omits a part of these components may be adopted or the storage unit 140 of the server 10 may constitute a part of the components.

An information storage medium 280 (a computer-readable medium) stores a program, data, and the like, and a function of the information storage medium 280 can be realized by an optical disk (a CD or a DVD), a magneto-optical disk (MO), a magnetic disk, a hard disk, a magnetic tape, a memory (a ROM), or the like.

In addition, the information storage medium 280 can store a program that causes a computer to function as each unit (a program which causes a computer to execute processing of each unit) of the embodiment described above. Moreover, as will be described later, the processing unit 200 performs various processes according to the embodiment described above based on the program (data) stored in the information storage medium 280.

A display unit 290 is for outputting an image generated according to the embodiment described above, and a function thereof can be realized by a CRT, an LCD, a touch panel-type display, a head-mounted display (HMD), or the like.

In particular, in the embodiment described above, using a touch panel display enables the display unit 290 to also function as the input unit 260 used by a player to perform game operations. In this case, as the touch panel, a touch panel adopting a resistive system (a four-wire system or a five-wire system), a capacitance system, an electromagnetic induction system, an ultrasonic surface acoustic wave system, an infrared scanning system, or the like can be used.

A sound output unit 292 is for outputting sound generated according to the embodiment described above, and a function thereof can be realized by a speaker, a headphone, or the like.

A communicating unit 296 performs various control for communicating with the outside (for example, a host apparatus or another terminal), and a function of the communicating unit 296 can be realized by hardware such as various processors or a communication ASIC, a program, or the like.

It should be noted that the terminal 20 may receive a program or data which is stored in an information storage medium or the storage unit 270 included in the server 10 and which causes a computer to function as each unit of the embodiment described above via the network, and store the received program or data in the information storage medium 280 or the storage unit 270. Cases where the terminal 20 functions by receiving a program and data in this manner can also be included in the scope of the invention.

The processing unit 200 (processor) performs, in conjunction with the server 10, processing such as game processing, image generating processing, and sound generating processing based on input data, a program, or the like from the input unit 260.

In particular, in the embodiment described above, game processing includes processing for starting a game when game start conditions are fulfilled, processing for advancing the game, processing for arranging objects such as a player character and other player characters, processing for displaying the objects, processing for computing a game result, and processing for ending a game when game end conditions are fulfilled.

In addition, the processing unit 200 performs various kinds of processing using the storage unit 270 as a work area. Functions of the processing unit 200 can be realized by hardware such as various processors (a CPU, DSP, or the like) and an ASIC (a gate array or the like) or by programs.

In particular, the processing unit 200 includes an object space setting unit 210, a display control unit 212, an input acceptance processing unit 213, a game control unit 214, a game computing unit 215, a virtual camera control unit 216, a game managing unit 217, a drawing unit 220, and a sound processing unit 230. Alternatively, a configuration which omits a part of these components may be adopted.

The object space setting unit 210 performs processing for arranging and setting various objects (objects constituted by primitive surfaces such as sprites, billboards, polygons, free-form surfaces, and subdivision surfaces) representing a displayed article such as an object (a player character, a mobile body, and other player characters), a movement path, a building, a tree, a column, a wall, or a map (landform) in an object space.

Specifically, the object space setting unit 210 determines a position and an angle of rotation (synonymous with orientation and direction) of an object (a model object), and arranges the object at the position (X, Y) or (X, Y, Z) at the angle of rotation (angles of rotation around the X and Y axes) or (angles of rotation around the X, Y, and Z axes).

In this case, an object space includes both a so-called virtual two-dimensional space and a virtual three-dimensional space. A two-dimensional space is a space in which, for example, an object is arranged at two-dimensional coordinates (X, Y), and a three-dimensional space is a space in which, for example, an object is arranged at three-dimensional coordinates (X, Y, Z).

In addition, when the object space is a two-dimensional space, a plurality of objects is arranged based on a priority set with respect to each of the objects. For example, processing can be performed involving sequentially arranging objects (sprites) starting with an object to be shown as if the object is located on an inward side and overlapping an object to be shown as if the object is located on a front side on top of the inward-side object.

Furthermore, by arranging an object with a large drawing size in a lower part of an image and arranging an object with a small drawing size in an upper part of the image, an object space corresponding to the upper part of the image can be shown as though located on an inward side and an object space corresponding to the lower part of the image can be shown as though located on a front side.

Moreover, when the object space is a three-dimensional space, objects are arranged in a world coordinate system.

The display control unit 212 causes the display unit 290 to display information necessary for preventing a recurrence of an immovable state in the game field based on information transmitted from the server 10.

The input acceptance processing unit 213 accepts an input instruction of a player input using the input unit 260 and outputs the accepted input instruction to the game control unit 214, the server 10, or both.

The game control unit 214 executes, in conjunction with the server 10, game processing based on a command accepted by the input acceptance processing unit 213.

In particular, the game control unit 214 executes control with respect to a character to be an operation target (in other words, a player character), a player character of another player, or another ancillary character based on various kinds of information (game information, information related to a movement of a player character (including information related to a movement determination), information related to a movement state, information related to salvation processing of providing relief from an immovable state, or information related to prevention of recurrence when an immovable state occurs), which has been send from the server 10, and a command (in other words, an input instruction) accepted by the input acceptance processing unit 213.

For example, the game control unit 214 executes a predetermined operation such as supporting attack on an enemy character or supporting capability recovery of an ally character in the case of a match-up game including an action game or a shooting game and growing crops or constructing a building in the case of a simulation game.

Meanwhile, the game control unit 214 performs a movement calculation of a character object that is an operation target such as a mobile body object (in particular, a character object such as a player character or other player characters) in an object space.

In other words, in conjunction with the server 10, the game control unit 214 performs processing of moving a mobile body object in an object space or controlling an action (motion or animation) of the mobile body object based on game information transmitted from the server 10 and input data input by a player using the input unit 260 or a program (a movement algorithm), various data (motion data), or the like.

Specifically, the game control unit 214 performs simulation processing of sequentially obtaining, for every frame, movement information (a direction of movement, an amount of movement, a speed of movement, a position, an angle of rotation, or an acceleration) and action information (a position or an angle of rotation of each part object) of an object. In this case, a frame refers to a unit of time when performing movement processing or action processing (simulation processing) of an object and image generation processing. In addition, in the embodiment described above, a frame rate may be fixed or may be variable in accordance with processing load.

Moreover, the game control unit 214 executes processing of moving an object based on an input direction in a three-dimensional object space. For example, the game control unit 214 associates a direction of movement with each input direction in advance and moves the object in the direction of movement corresponding to the input direction.

In addition, the game control unit 214 may execute processes in conjunction with the server 10, and a part of or all of the game control unit 214 may be formed in the server 10.

The game computing unit 215 performs a variety of processing for game computation. In particular, the game computing unit 215 performs computing processes necessary for executing a shooting game such as formation of an object space determined in advance of the game, formation of an object space based on a map, progress of the game based on a scenario set in advance in accordance with an operation by the user, a match-up with a player character, other player characters, or other objects, and management of parameters during the match-up.

Moreover, while the game computing unit 215 executes the processes in conjunction with the server 10, a part of or all of the game computing unit 215 may be formed in the server 10.

The virtual camera control unit 216 generates an image that appears to have depth of a game space visible from a given perspective. In this case, the virtual camera control unit 216 performs control processing of a virtual camera (a perspective) for generating an image that is visible from a given (an arbitrary) perspective in the object space. Specifically, the virtual camera control unit 216 performs processing of controlling a position (X, Y, Z) or an angle of rotation (angles of rotation around the X, Y, and Z axes) of the virtual camera (processing of controlling a perspective position or a perspective direction).

For example, when photographing an object (for example, a character, a ball, or a vehicle) from behind with a virtual camera, the position or the angle of rotation of the virtual camera (an orientation of the virtual camera) is controlled so that the virtual camera tracks a change in the position or a change in the rotation of the object.

In this case, the virtual camera can be controlled based on the position, the angle of rotation, the speed, or the like of the object obtained by the game control unit 214. Alternatively, control may be performed for causing the virtual camera to rotate in an angle of rotation determined in advance or causing the virtual camera to move along a movement path determined in advance. In addition, in this case, the virtual camera is controlled based on virtual camera data for specifying a position (a movement path) or an angle of rotation of the virtual camera.

Moreover, the virtual camera may be set as a perspective of a player character. Furthermore, when a plurality of virtual cameras (perspectives) are present, the control processing described above is performed with respect to each virtual camera.

In conjunction with the server 10, the game managing unit 217 sets a player character and various items to be used by each player in a game such as a match-up game or the like based on an operation by the player input via the input unit 260, and registers the player character and the various items in the user information 273.

The drawing unit 220 performs image drawing processing based on various pieces of information related to image generation transmitted from the server 10 and results of a variety of processing (game processing) performed by the processing unit 200 and, accordingly, generates an image and outputs the generated image to the display unit (display) 290.

In particular, the image generated by the drawing unit 220 may be a so-called two-dimensional image or a so-called three-dimensional image. In particular, the drawing unit 220 generates an image which is visible from a virtual camera in an object space and which is to be displayed on a screen.

When generating a two-dimensional image, the drawing unit 220 sequentially draws objects in an ascending order of set priorities, and when objects overlap with each other, the drawing unit 220 draws the object with the higher priority on top.

In addition, when generating a three-dimensional image, the drawing unit 220 first receives input of object data (model data) including vertex data (positional coordinates, texture coordinates, color data, a normal vector, an $\alpha$ value, or the like of a vertex) of each vertex of an object (a model), and based on vertex data included in the input object data, performs vertex processing. When performing vertex processing, vertex generation processing (tesselation, curved surface division, or polygon division) for redividing a polygon may be performed if necessary.

In addition, in vertex processing, movement processing, coordinate transformation (world coordinate transformation or camera coordinate transformation), clipping processing, perspective transformation, or geometry processing such as light source processing of a vertex is performed, and based on a processing result thereof, vertex data provided with respect to a group of vertices that constitute an object is changed (updated or adjusted). Furthermore, rasterization (scan conversion) is performed based on the vertex data after the vertex processing, and a surface of a polygon (a primitive) is associated with pixels. Following the rasterization, pixel processing (fragment processing) for drawing pixels constituting an image (fragments constituting a display screen) is performed.

In pixel processing, various processing including texture reading (texture mapping), setting/changing of color data, translucent compositing, and anti-aliasing is performed to determine a final drawing color of pixels constituting an image, and drawing colors of an object subjected to translucent composition is output (drawn) to the image buffer 272 (a frame buffer: a buffer capable of storing image information in pixel units; a VRAM or a rendering target). In other words, in pixel processing, per-pixel processing is performed in which image information (a color, a normal, brightness, an a value, or the like) is set or changed in pixel units.

Accordingly, an image viewed from a virtual camera (a given perspective) set in an object space is generated. When a virtual camera (a perspective) exists in plurality, an image can be generated so that images viewed from the respective virtual cameras are displayed on one screen as divided images.

It should be noted that the vertex processing and the pixel processing performed by the drawing unit 220 may be realized in accordance with a shader program described in a shading language by a so-called programmable shader (a vertex shader or a pixel shader) that is hardware which makes drawing processing of a polygon (a primitive) programmable. With a programmable shader, making processing in vertex units and processing in pixel units programmable increases a degree of freedom of contents of drawing processing and significantly improves expressiveness as compared to static drawing processing by hardware.

A lock-on processing unit (not shown) executes lock-on processing in which an object satisfying a lock-on condition such as a condition where an object at a close distance from a player character is preferentially selected or a condition where an object close to a central axis when crosshairs are trained is determined (locked-on) as a selection object is preferentially selected from a plurality of objects that appear in a game space.

In addition, when drawing an object, the drawing unit 220 performs geometry processing, texture mapping, hidden surface removal processing, α blending, and the like.

In geometry processing, processing such as coordinate transformation, clipping processing, perspective projection transformation, or a light source calculation is performed with respect to the object. In addition, object data (a positional coordinate, a texture coordinate, color data (brightness data), a normal vector, an α value, or the like of vertices of an object) after the geometry processing (after the perspective projection transformation) is stored in the storage unit 270.

In texture mapping, processing of mapping a texture (a texel value) stored in a texture storage unit of the storage unit 270 to an object is performed. Specifically, using a texture coordinate or the like set (added) to a vertex of an object, a texture (surface properties such as a color (RGB) and an a value) is read from the texture storage unit of the storage unit 270 and the texture that is a two-dimensional image is mapped to an object. In this case, processing for associating pixels and texels with each other and bilinear interpolation or the like as interpolation of texels are performed.

It should be noted that, in the embodiment described above, processing of mapping a given texture may be performed when drawing an object. In this case, a color distribution (a texel pattern) of the texture to be mapped can be dynamically changed.

In addition, in this case, a texture with a different color distribution (a pixel pattern) can be dynamically generated, or a plurality of textures with different color distributions may be prepared in advance and a texture to be used may be dynamically switched to another texture. Furthermore, the color distribution of a texture may be changed in object units.

In the hidden surface removal processing, hidden surface removal processing according to Z-buffering (a depth comparison method, a Z test) using a Z-buffer (a depth buffer) is performed in which a Z-value (depth information) of a drawing pixel is stored. Specifically, when drawing a drawing pixel corresponding to a primitive of an object, the Z-value stored in the Z-buffer is referenced and the referenced Z-value of the Z-buffer and a Z-value in the drawing pixel of the primitive are compared with each other, and when the Z-value in the drawing pixel is a Z-value to the front as viewed from the virtual camera (for example, a smaller Z-value), drawing processing of the drawing pixel is performed and, at the same time, the Z-value of the Z-buffer is updated to a new Z-value.

In α blending (α compositing), the drawing unit 220 performs translucent compositing processing (straight α blending, additive α blending, or subtractive α blending) based on an α value (an A value). It should be noted that the α value is information that can be stored in association with each pixel (texel, dot) and is, for example, additional information other than color information. The α value can be used as mask information, translucency (equivalent to transparency and opacity), bump information, and the like.

In addition, the drawing unit 220 may generate an image to be displayed in a display region corresponding to a contact detection region. The image to be displayed in the display region may be, for example, an image including an object.

The sound processing unit 230 performs sound processing based on results of a variety of processing performed by the processing unit 200, generates game sounds including a BGM, a sound effect, and voices, and outputs the game sounds to the sound output unit 292.

4. Method 4.1. Overview

Figure 4:
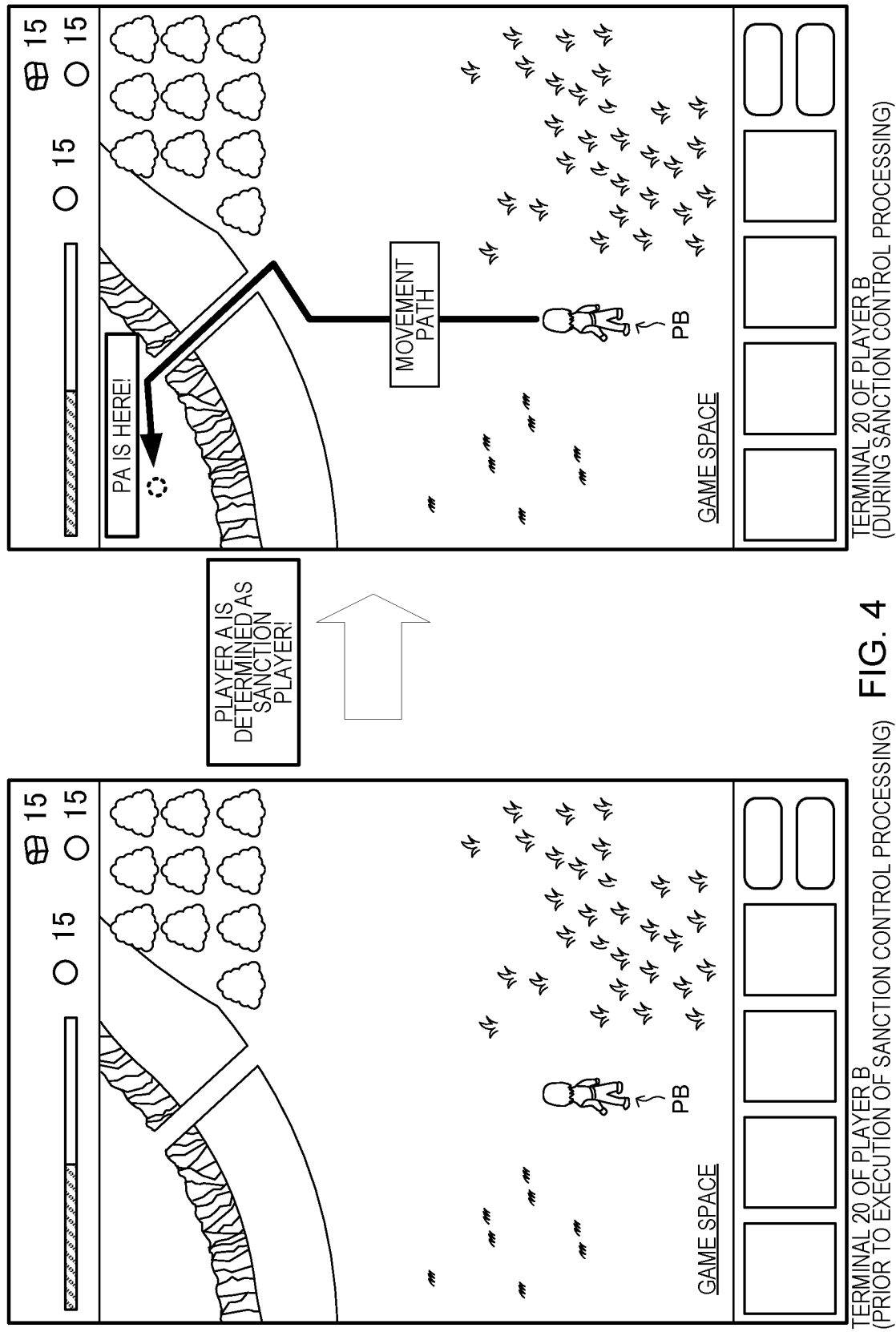
FIG. 4 is a diagram illustrating an overview of sanction control processing including sanction determination processing according to an embodiment of the invention.

Next, an overview of the method (sanction control processing including sanction determination processing) according to the embodiment described above will be described with reference to FIG. 4. FIG. 4 is a diagram illustrating an overview of sanction control processing including sanction determination processing according to the embodiment described above.

For example, in conjunction with the terminal 20 operated by each player, the server 10 is configured to form a single game space (in other words, a game field according to a virtual three-dimensional space) and execute a match-up game such as a shooting game or an action game involving a plurality of player characters respectively operated and controlled by each player in the game field.

In addition, the server 10 is configured to execute a game involving the movement of the plurality of player characters in the game field formed in the game space and provide the terminal 20 with information related to the game.

In particular, the server 10 is configured to determine, for each player, whether a penalty has occurred in a state or an action by a player character or whether an action by the player character is an action for which a penalty has occurred during the game, and impose a predetermined sanction with respect to a player in a state where the penalty has occurred or a player having executed an action for which a penalty has occurred.

Specifically, the server 10 manages player-related information related to each player which is stored in the player information storage unit 146 for each player during the game.

Furthermore, the server 10 is configured to:

(A1) determine, for each player or for each group (hereinafter, also referred to as a "team") constituted by a plurality of players, whether or not to impose a sanction as a sanction target player on a player concerned (in other words, a determination target player) based on at least either one of a state and an action of an operation target player character of the determination target player; and (A2) execute, when it is determined by the sanction determination processing that a sanction is to be imposed on the determination target player as a sanction target player, sanction control processing of providing a terminal 20 owned by a player who differs from the sanction target player or a terminal 20 owned by a player who belongs to a group that differs from a group to which the sanction target player belongs with player-related information of the sanction target player as the sanction.

In particular, the server 10 is configured to execute, for each player or for each team, sanction determination processing of determining to impose a sanction on a player who is a determination target when at least either one of a state and an action of an operation target player character (in other words, a determination target player character) of the player concerned satisfies a given sanction condition for imposing the sanction.

For example, let us envisage a case where players A, B, C, and D are participating in a match-up game as determination target players and, during the game, a determination is made as to whether or not a sanction is to be imposed on each player as a sanction target player.

In this case, when a state of the player A satisfies a given sanction condition (no movement for a certain period or longer) and the player A is determined as a sanction target player, as illustrated in FIG. 4, the server 10 provides the terminals 20 of the players B, C, and D with information indicating a position in the game field of the game space where an operation target player character PA of the player A is present.

FIG. 4 illustrates game screens before and after the sanction determination processing which are displayed on the terminal 20 of the player B who is provided with the information and, in particular, the right figure of FIG. 4 illustrates an example of a game screen displaying that an operation target player character PB of the player B and the player character PA that is an operation target of the sanction target player A (a position indicated by a dash-line circle) are present in an image of the game field of the game space in which the sanction determination processing is being executed, and displaying a movement path (navigation information) from the player character PB to the player character PA.

According to this configuration, in the embodiment described above, for example, in a match-up game of which match-ups between players or groups (teams) are an important part such as survival games including battle royale games, with respect to a player who attempts to prolong life by excessively avoiding match-ups with other players, a current position or a state of a determination target player character of the player can be exposed to other players as a penalty (a sanction).

In other words, in the embodiment described above, since an environment can be constructed in which it is difficult to adopt such a strategy of prolonging life by excessively avoiding match-ups with other players, the game can be invigorated and, as a result, an entertainment level of the game can be improved.

Moreover, in the embodiment described above, other player characters may be characters that are operated by players or NPCs (non-player characters) which are controlled in accordance with game processing by a program or the like and which are not controlled by players.

Furthermore, in the embodiment described above, as a general rule, a case where a match-up game is executed by an individual will be described as an example. However, a case where a match-up game is executed in units of teams respectively constituted by a plurality of players will be described in a modification.

4.2. Management of Player-Related Information

Next, management of player-related information will be described with reference to FIG. 5. FIG. 5 is a diagram illustrating an example of player-related information stored in the player information storage unit 146.

The player-related information stored for each player in the player information storage unit 146 includes information on a player character to be an operation target of each player.

For example, as illustrated in FIG. 5, each piece of player-related information includes the following:

(A1) one or more pieces of identification information such as a nickname, a player ID, a player character ID, and a log-in name of the player and, when the player belongs to a team, a team name or an ID of the team to which the player belongs (hereinafter, referred to as "affiliation information");

(A2) coordinate information including information (positional information) on coordinates in a virtual space of a player character operated by the player, navigation information, and an orientation of the player character;

(A3) state information indicating a state including a posture of a player character and history information of the state (hereinafter, referred to as "state history information");

(A4) character information related to equipment (items) and abilities of the player character (including information on types of the items which the player character is equipped with and a state in which the player character is equipped with the items);

(A5) action information including ongoing and past positions in a match-up game space of a player character such as during preparation of equipment, during rest (including while asleep and during meals), and during match-ups, equipment used during the match-ups, and an area through which the player character is moving as well as information related to a history of the action (hereinafter, referred to as "action history information");

(A6) information related to a same team as the player character such as the number and positions of player characters belonging to the same team (hereinafter, referred to as "team information");

(A7) information on in-game currency owned by the player character (hereinafter, referred to as "currency information"), and billing information related to an amount billed thus far and billing history;

(A8) characteristic information indicating characteristics of a player character and attribute information indicating attributes of the player character; and (A9) camera information including an orientation of a virtual camera that visualizes a virtual space.

The information managing unit 104 updates, in conjunction with the game managing unit 103, player-related information related to each player or each player character is being stored in the player information storage unit 146 at the start of a game or in accordance with game progress.

4.3. Sanction Determination Processing

Next, the sanction determination processing according to the embodiment described above will be described.

The determination processing unit 105 executes, for each player, sanction determination processing of determining whether or not to impose a sanction as a sanction target player based on a state, an action, or both of a determination target player character who is an operation target of the player concerned and who is to be a determination target.

In particular, the determination processing unit 105 refers to information which is stored as player-related information in the player information storage unit 146 and which is information specifying a state of a determination target player character, information specifying an action of the determination target player character, or both, and determines whether or not a given condition (hereinafter, also referred to as a "sanction condition") for imposing a sanction such as whether a determination target player or a determination target player character has satisfied a condition set in advance or has not met a quota set in advance.

Specifically, the given sanction condition includes:
(A1) a condition related to a period for detecting a state or an action of the determination target player character; and
(A2) a condition defined based on coordinate information indicating coordinates in a virtual space of the target player character.

For example, the condition related to a period of (A1) includes the following:
(A1-1) a period during which a specific state defined by the sanction condition continues satisfies a defined condition such as a determination target player character being in a prostrated state or a state of mimicry for a certain period;
(A1-2) a period during which a specific action is maintained or a period during which a specific action is not maintained satisfies a defined condition such as a period during which an action related to attack is not taken with respect to another player (the period includes a period during which an attacking action is not taken such as preparation for sniping in addition to an actual attack such as sniping) or a period of no movement in a game space continues for a certain length or more;
(A1-3) a period for detecting a timing at which a player character assumes a specific state or a timing at which the player character engages in a specific action as defined in the sanction condition satisfies a defined condition; and
(A1-4) a cumulative period (for example, one minute) during which an action set in advance such as a prostrated state or a state of mimicry within a certain period such as a predetermined period immediately prior to a present time point (for example, two immediately previous minutes) or after a lapse of a predetermined period (for example, after a lapse of two minutes) from the start of a game stage satisfies a defined condition.

Moreover, when executing the sanction determination processing using a condition related to a period of (A1), the determination processing unit 105 may execute processing (cooling time setting processing) of prohibiting the execution of the sanction determination processing until a certain period lapses from an immediately previous sanction determination processing.

Meanwhile, for example, a condition defined based on coordinate information of (A2) includes the following:
(A2-1) a determination target player character is not present in a vicinity (a 5 m-radius centered on an object character inside the game space) of another character such as another player character (including specific characters of specific players such as players with the highest records as well as a boss character); and
(A2-2) the determination target player character is not present or there is no trace of the determination target player character ever being present at an appearance-required point set during a game such as a food supply point or a checkpoint provided in a game space.

Alternatively, when information set in advance is included in state information of a player character or action history information of the player character, the determination processing unit 105 may execute sanction determination processing of determining a player concerned as a sanction target player instead of sanction determination processing based on a sanction condition.

For example, in a match-up game where information of a passed flag is stored when a player character passes a specific point, the determination processing unit 105 may determine a player for which information of the passed flag is not stored or a player having last passed the specific point as a sanction target player.

4.4. Sanction Control Processing

Next, the sanction control processing according to the embodiment described above will be described with reference to FIGS. 6A to 10B. FIGS. 6A to 10B are diagrams illustrating information providing processing (provision of coordinate information, state information, and action information) according to the embodiment described above.

4.4.1. Basic Principle of Sanction Control Processing

The sanction control processing unit 106 executes, when it is determined by the sanction determination processing that a sanction is to be imposed on a player who is a determination target as a sanction target player, sanction control processing of providing, in conjunction with the information providing unit 110, a terminal 20 owned by a player who differs from the sanction target player with player-related information of the sanction target player.

In addition, in conjunction with the information providing unit 110, the sanction control processing unit 106 transmits not only information related to a player such as a level of a sanction target player but also information related to an operation target player character (in other words, a sanction target player character) operated by the sanction target player such as a position or a state of the player character or an item which the player character is equipped with as player-related information to the terminal 20 of a player concerned.

In other words, in conjunction with the information providing unit 110, the sanction control processing unit 106 generates image data for displaying player-related information in association with identification information of the sanction target player on a game screen being displayed on the terminal 20 of a player (hereinafter, referred to as a "provision target player") to be provided with the player-related information, and transmits the generated image data to the terminal 20 of the player concerned.

In particular, in conjunction with the information providing unit 110, the sanction control processing unit 106 generates display data for displaying the player-related information of the sanction target player together with the identification information of the specific player in a display region of a game space being executed by each player or a display region of an item such as a radar or a map provided separately from the game space on the terminal 20.

Furthermore, as the identification information, the sanction control processing unit 106 uses information included in the player-related information such as a player ID, a player character ID, a log-in name of the player, a nickname of the player in the game, and a name of a player character.

Moreover, in conjunction with the information providing unit 110, the sanction control processing unit 106 may generate display data for displaying the player-related information of the sanction target player by incorporating the display data in game information generated to be provided to each terminal 20, or generate the display data separately from the game information.

In addition, as player-related information to be provided to the terminal 20 concerned, the sanction control processing unit 106 uses:

(A1) information related to coordinates (in other words, coordinate information) such as information (positional information) of coordinates in a virtual space of a player character of a sanction target player;

(A2) state information indicating a state of the player character of the sanction target player and state history information;

(A3) action information indicating an action of the player character of the sanction target player and action history-related information such as action history information indicating a history of actions of the player character of the sanction target player; or (A4) action prediction-related information such as action prediction information of the player character having been analyzed based on the action history.

4.4.2. Display of Coordinate Information of Sanction Target Player

As player-related information, the sanction control processing unit 106 provides the terminal 20 of a player concerned with information (hereinafter, also simply referred to as "coordinate information") including information on coordinates in a game space of a sanction target player character, coordinate-related information related to the coordinates, or both in association with the identification information of the sanction target player.

In particular, in addition to information on coordinates of the sanction target player character, coordinate information includes coordinate-related information such as:

(A1) information on an area of a game space divided in advance to which the coordinates belong;

(A2) navigation information suggesting a route to coordinates of the sanction target player character or a direction of the coordinates from a position in a virtual space of a player character (hereinafter, also referred to as a "self-player character") of a provision target player; and (A3) an orientation of a player character and an orientation of a virtual camera that visualizes a virtual space.

Figure 6B:
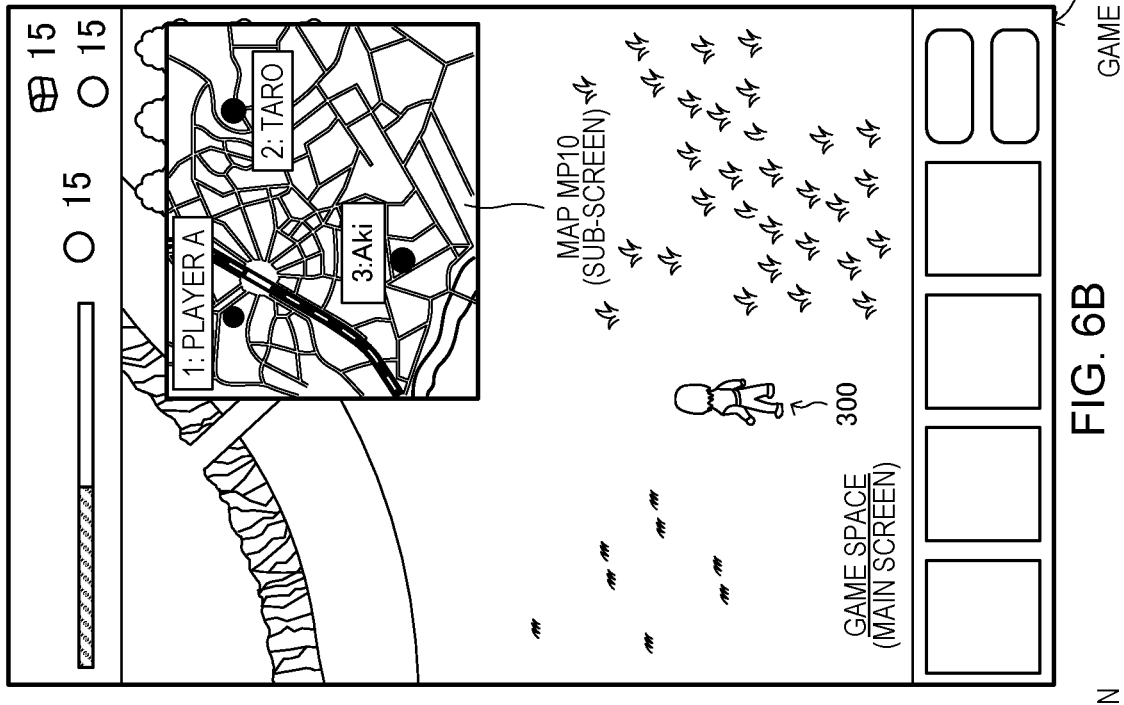
FIGS. 6A and 6B are diagrams illustrating sanction control processing (in a case of coordinate information) which is executed by a server according to an embodiment of the invention.
Figure 6A:
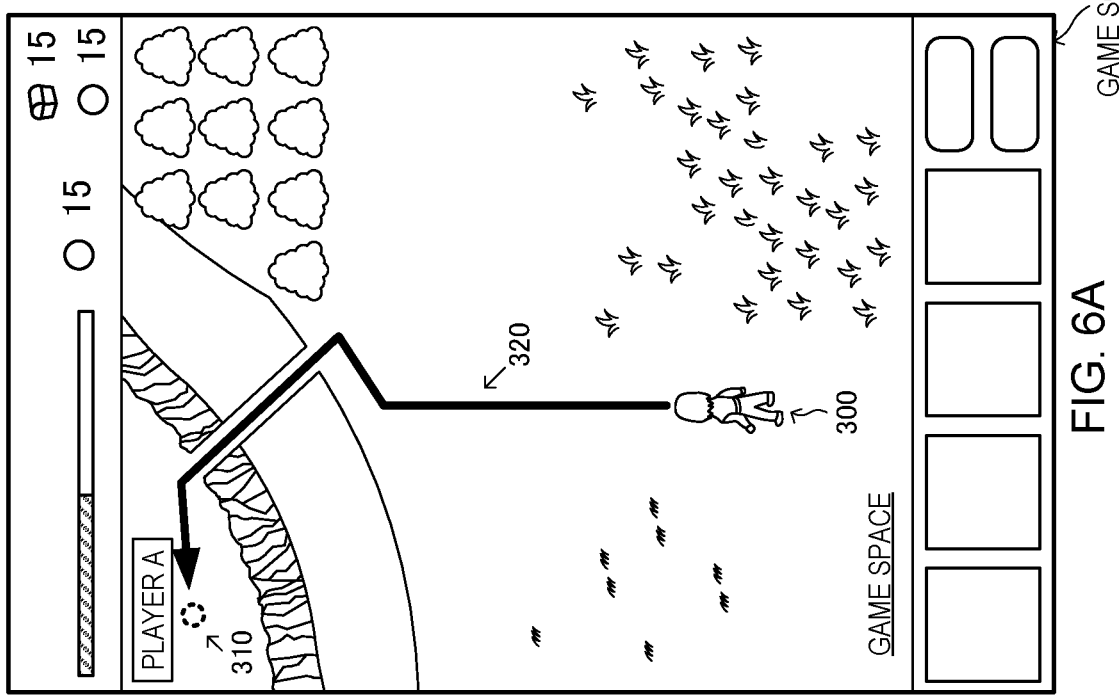

In addition, as illustrated in FIG. 6A, the sanction control processing unit 106 generates display data for displaying coordinate information of the player character of the sanction target player on a main game screen displaying the inside of a game space in which player characters move, and provides the terminal 20 concerned with the generated display data.

Furthermore, as illustrated in FIG. 6B, the sanction control processing unit 106 generates display data for displaying coordinate information of the player character of the sanction target player on a sub-game screen on which is displayed a map of the game space or a radar for observing the game space separately from the main game screen displaying the inside of the game space, and provides the terminal 20 concerned with the generated display data.

It should be noted that FIGS. 6A and 6B represent an example in which coordinate information is displayed on the terminal 20 of a provision target player who operates the self-player character.

In particular, FIG. 6A illustrates an example of a case where coordinates of a sanction target player character 310 of a sanction target player (A) is being displayed on a main game screen displaying the inside of the game space and where a route 320 from coordinates of a self-player character 300 to the sanction target player character 310 is being displayed.

In addition, FIG. 6B illustrates an example of a case where coordinates of the sanction target player character are being displayed on a map MP10 displayed on a sub-screen that is separate from the main game screen displaying the inside of the game space.

4.4.3. Display 1 of State Information of Sanction Target Player Character: Basic As player-related information, the sanction control processing unit 106 provides the terminal 20 of a player concerned with state information indicating a state of a sanction target player character of a sanction target player in association with the identification information of the sanction target player.

In particular, state information includes the following:

(B1) information related to equipment which a player character is equipped with (including equipment for attack, equipment for defense against attacks, equipment for supporting attack or defense, and equipment which enables the player character to be camouflaged into a background), capability of the equipment (including use conditions such as remaining ammunition), whether or not the equipment had been used when defeating another player character, a level of the equipment, a degree of proficiency (skill of handling) of the player character with respect to the equipment, and an expiration date of the equipment;

(B2) information related to a capability of a player character (a type of capability such as an attack level, a defense level, agility, magic, or supernatural powers);

(B3) information related to an attitude of a player character (a direction which the player character faces and a posture thereof) or a state of the player character (a wet state, a state of food shortage, or the like);

(B4) information related to a condition leading to a player character being defeated such as a stamina level of the player character; and (B5) information related to a status such as a level, a completion rate of tasks, or the like of a player or a player character.

Figure 7B:
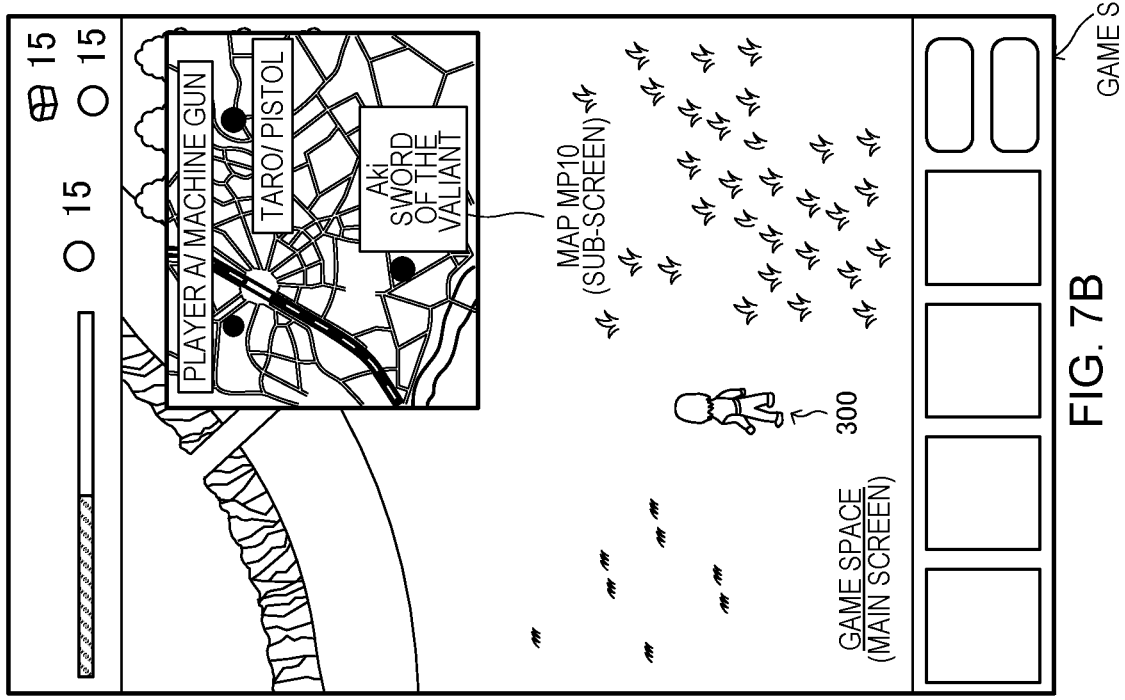
FIGS. 7A and 7B are diagrams illustrating sanction control processing (in a first case of state information) which is executed by a server according to an embodiment of the invention.
Figure 7A:
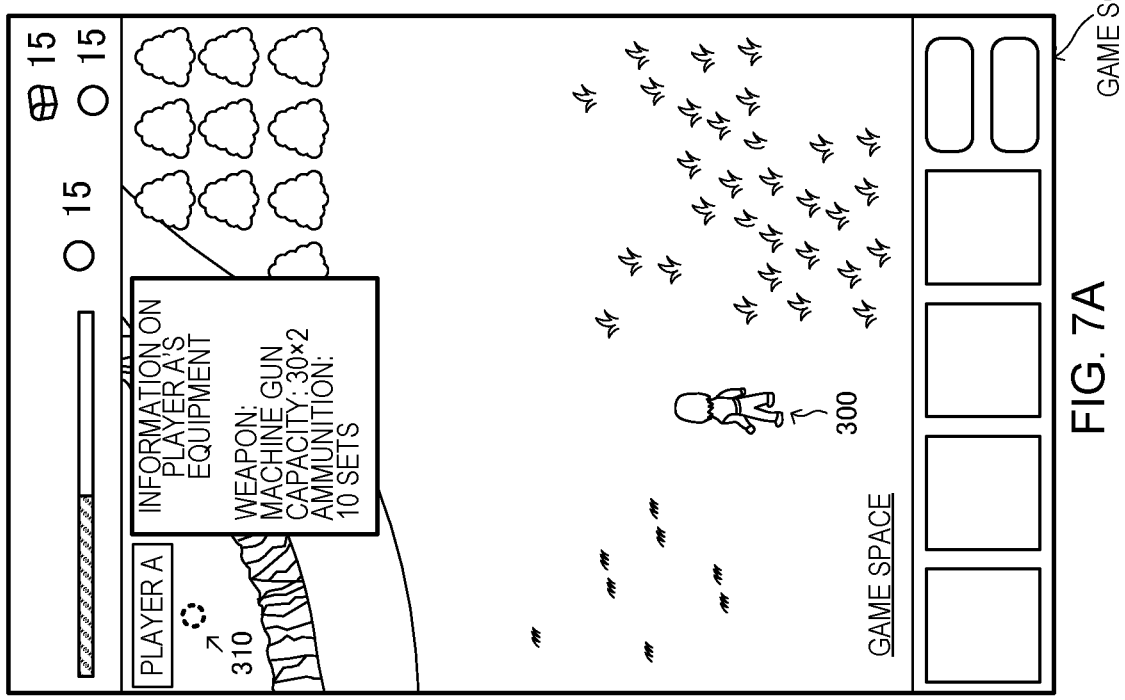

In addition, as illustrated in FIG. 7A, the sanction control processing unit 106 generates display data for displaying information related to equipment of the sanction target player character together with coordinate information on a main game screen displaying the inside of a game space in which player characters move, and provides the terminal 20 concerned with the generated display data.

Furthermore, as illustrated in FIG. 7B, the sanction control processing unit 106 generates display data for displaying state information indicating a stamina level (a remaining stamina level until defeat) together with coordinate information on a sub-game screen on which is displayed a map of the game space or a radar for observing the game space separately from the main game screen displaying the inside of the game space, and provides the terminal 20 concerned with the generated display data.

It should be noted that FIGS. 7A and 7B represent an example in which state information is displayed on the terminal 20 of a provision target player who operates the self-player character.

In particular, FIG. 7A illustrates an example of a case where information (equipment information) related to the equipment of a sanction target player character of a sanction target player (A) is being displayed together with coordinates of the sanction target player character on a main game screen displaying the inside of the game space. In addition, FIG. 7B illustrates an example of a case where coordinates of the sanction target player character of the sanction target player and equipment information are being displayed on the map MP10 displayed on a sub-screen that is separate from the main game screen displaying the inside of the game space.

4.4.4. Display 2 of State Information of Sanction Target Player Character: Disabled State When a sanction target player character is in an unrecognizable state where the sanction target player character cannot be recognized by other players or the sanction target player character is in a camouflaged state where the sanction target player character is camouflaged as a given object in the virtual space, the sanction control processing unit 106 may provide the terminal 20 of a player concerned with information for displaying a disabled state where the unrecognizable state or the camouflaged state of the sanction target player character has been disabled in association with identification information of the sanction target player.

For example, in the embodiment described above, based on an operation by each player, a player character who is an operation target can be set during the execution of a game to a state where the player character is unrecognizable by other players (in other words, an unrecognizable state) using various objects arranged in a game space such as a mobile body object, a building object, naturally-formed objects including a tree, grass, a bush, and a boulder, or a geomorphic object having a bulge, a cave, a hole, or a depression.

In addition, for example, based on an operation by each player, an operation target player character can set to a camouflaged state during the execution of a game where, using a decorative item (clothing or a decorative tool), an outward appearance or an external shape of the operation target player character is set to a same color (including similar colors) or a same tinge as each object among grass, a mountain area, a forest area, an urban area, an ocean, a river, or a lake, an architectural structure such as a building, and a mobile body such as an automobile or a train so that the outward appearance or the external shape of the operation target player character becomes similar to the surrounding scenery in the game space where the player character is present.

Figure 8B:
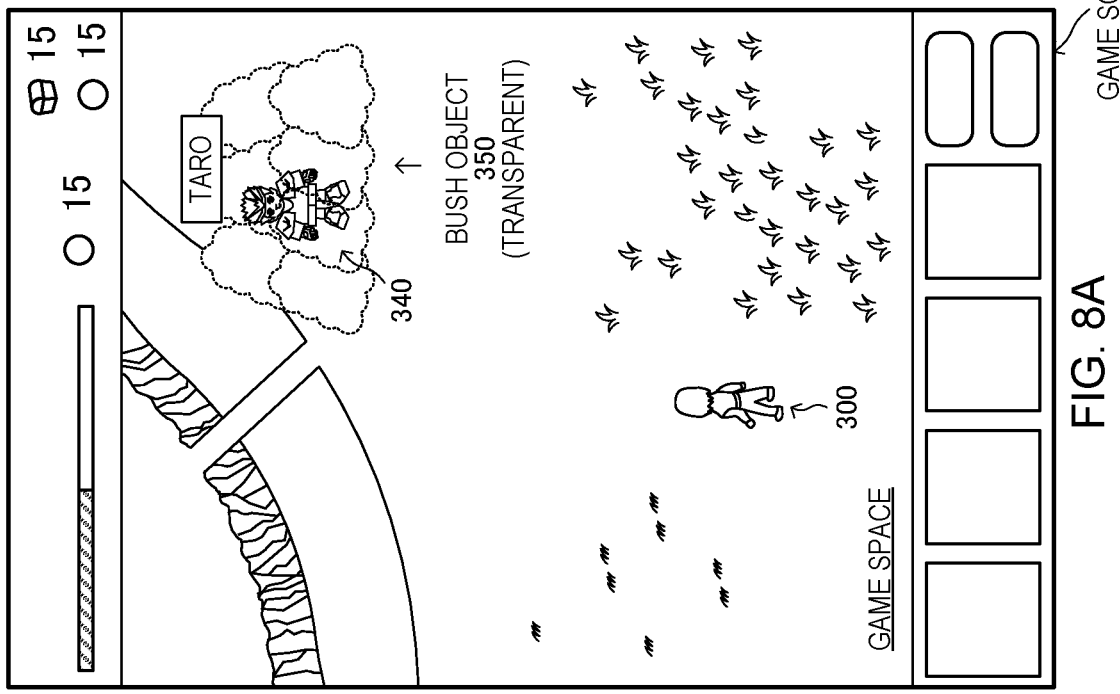
FIGS. 8A and 8B are diagrams illustrating sanction control processing (in a second case of state information) which is executed by a server according to an embodiment of the invention.
Figure 8A:
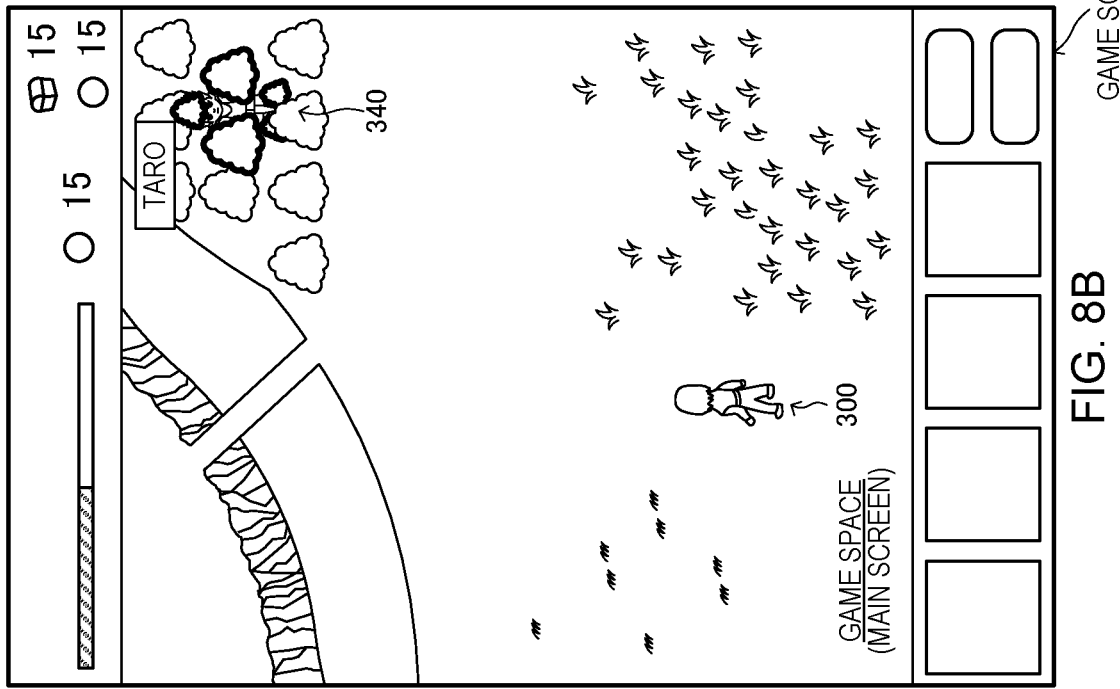

Furthermore, when a sanction target player character is in an unrecognizable state, the sanction control processing unit 106 generates display data in which an object (a bush object) 350 located between a sanction target player character (a player character of a player [Taro]) 340 in hiding and the self-player character 300 is changed to a transparent object, and provides the terminal 20 concerned with the generated display data so that an image such as that illustrated in FIG. 8A is displayed on the terminal 20 concerned.

Moreover, when a sanction target player character is in a camouflaged state, the sanction control processing unit 106 generates display data in which an outward appearance or an external shape of the sanction target player character (the player character of the player [Taro]) 340 in camouflage is highlighted and provides the terminal 20 concerned with the generated display data so that an image such as that illustrated in FIG. 8B is displayed on the terminal 20 concerned.

Figure 9:
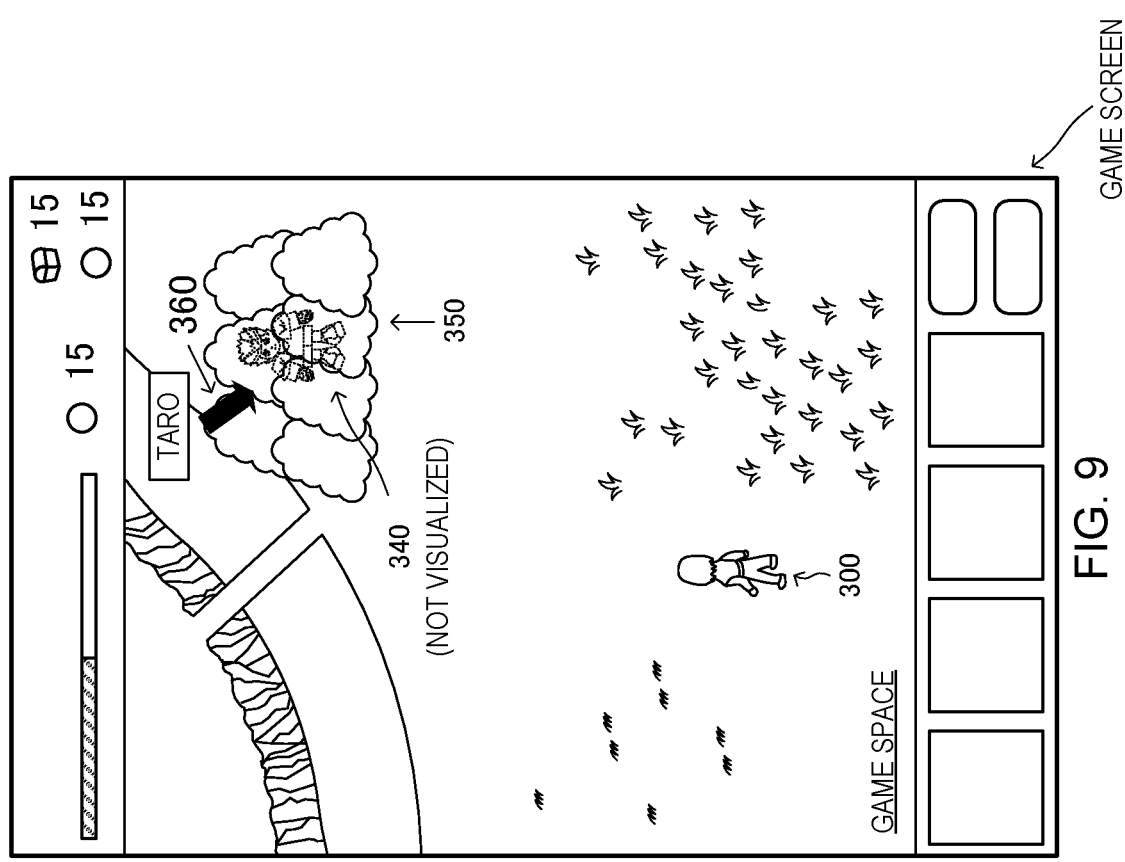
FIG. 9 is a diagram illustrating sanction control processing (in a third case of state information) which is executed by a server according to an embodiment of the invention.

It should be noted that, in place of the display data described above, for example, the sanction control processing unit 106 may generate display data for displaying an arrow or a text in a vicinity of the sanction target player character (the player character of the player [Taro]) 340 in an unrecognizable state or a camouflaged state so that an image such as that illustrated in FIG. 9 is displayed on the terminal 20 concerned.

In particular, FIG. 9 illustrates a main image in which an arrow object 360 is formed in the vicinity of the sanction target player character (the player character of the player [Taro]) 340 who is hiding in the bush object 350.

4.4.5. Display of Action Information of Sanction Target Player Character

As player-related information, the sanction control processing unit 106 may provide the terminal 20 of a player concerned with action information of a sanction target player character who is an operation target of a sanction target player in association with the identification information of the sanction target player.

In particular, action information includes the following:
(C1) information indicating a device used for attack is being prepared such as a firearm being reloaded;
(C2) information indicating a period until the preparation is completed; and
(C3) information indicating a state where an attack by another player cannot be avoided, such as when resting, when climbing a wall, or when engaged in a match-up.

Figure 10B:
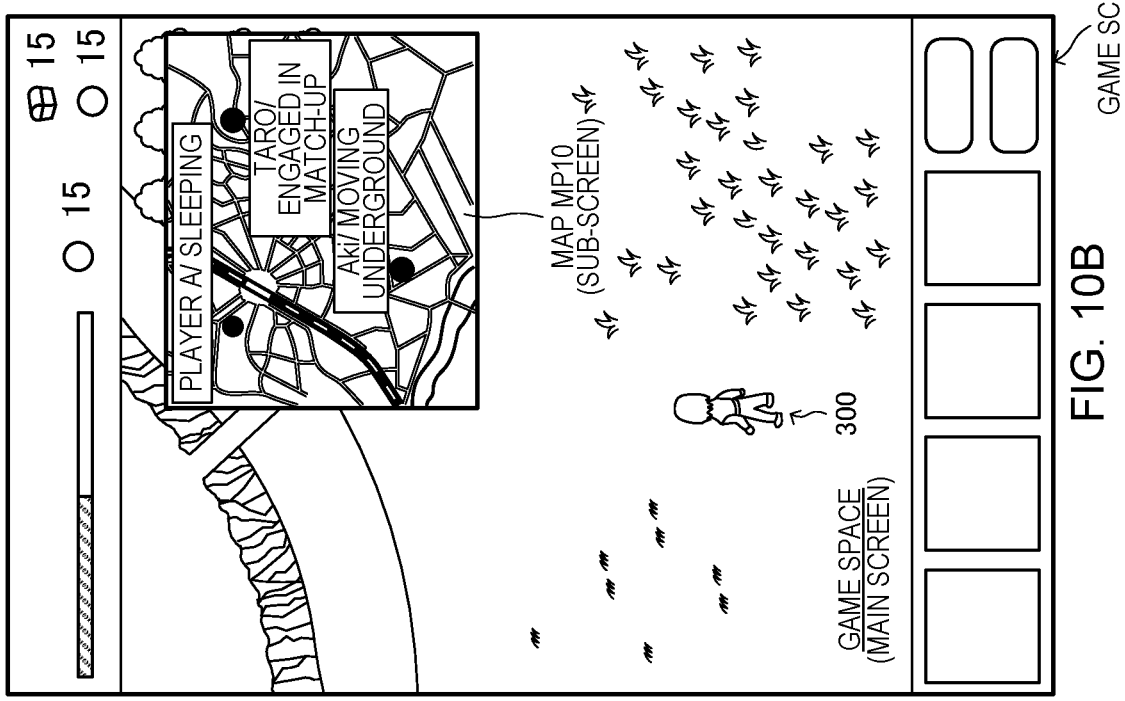
FIGS. 10A and 10B are diagrams illustrating sanction control processing (in a case of action information) which is executed by a server according to an embodiment of the invention.
Figure 10A:
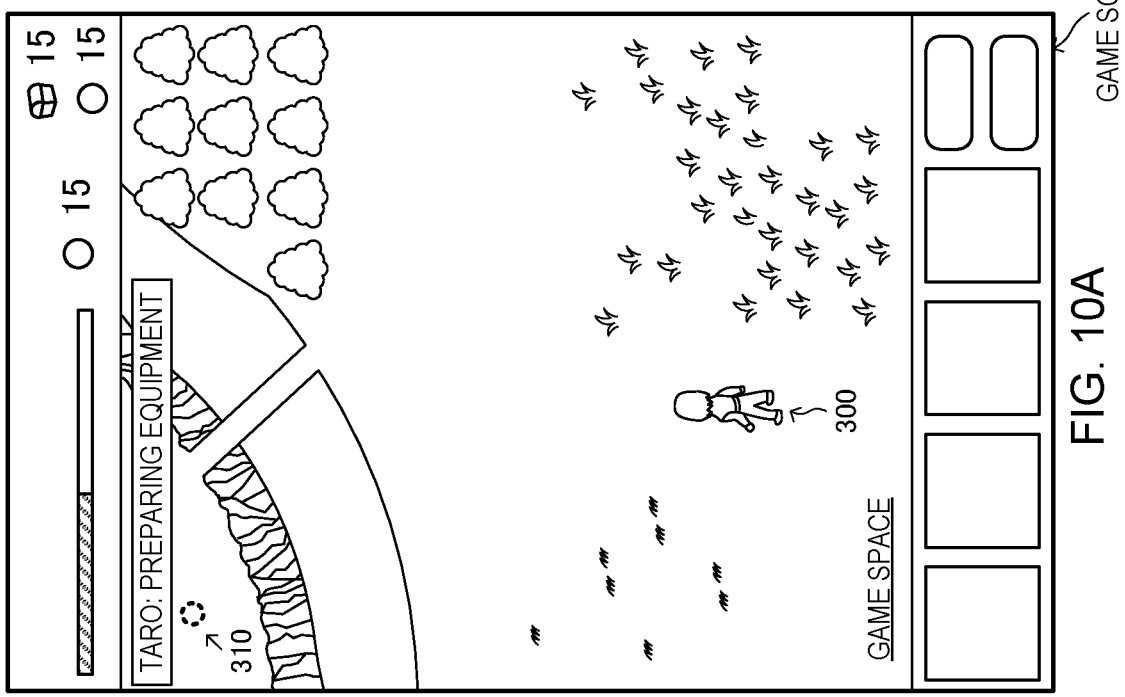

In addition, as illustrated in FIG. 10A, the sanction control processing unit 106 generates display data for displaying action information indicating that the sanction target player character is preparing equipment together with coordinate information on a main game screen displaying the inside of a game space in which player characters move, and provides the terminal 20 concerned with the generated display data.

Furthermore, as illustrated in FIG. 10B, the sanction control processing unit 106 generates display data for displaying action information indicating "while asleep (sanction target player character: A)", "being engaged in a match-up (sanction target player character; Taro)", or "moving underground (sanction target player character: Aki)" together with coordinate information on a sub-game screen on which is displayed the map MP10 of the game space separately from the main game screen displaying the inside of the game space, and provides the terminal 20 concerned with the generated display data.

4.4.6. Display of Action History Information or the Like of Sanction Target Player Character As player-related information, the sanction control processing unit 106 may provide the terminal 20 of a player concerned with, in association with identification information of a sanction target player, action history-related information at least including action history information indicating a history of actions of a player character of the sanction target player or action prediction-related information at least including action prediction information of the player character having been analyzed based on the action history information.

In particular, for example, the sanction control processing unit 106 may provide the terminal 20 of a player concerned with action history-related information and action prediction-related information based on action history information or action prediction information such as information with respect to player characters of other players including a method of approach, a method of attack, or a method of escape with respect to a player character of a sanction target player.

In particular, action history-related information includes the following:

(D1) a position or an area in a virtual space where a sanction target player character appears a predetermined number of times or more; and (D2) information related to match-ups such as an action route, a type of an executed attack, or the number of attacks executed by the sanction target player character or a type of attack or the number of attacks sustained from other player characters during a predetermined period prior to a given timing or during a predetermined number of latest match-ups.

In addition, action prediction-related information includes the following:

(E1) information related to a reason for victory or a reason for defeat by a sanction target player character during a predetermined period prior to a given timing or during a predetermined number of latest match-ups;

(E2) information related to a method of attack that ensures victory over a sanction target player character based on an action history of the sanction target player character such as attacking in such a manner that, when having equipment that requires a long preparation period, the preparation period must be secured during a match-up; and (E3) information (hereinafter, referred to as "action prediction-related information") which is related to future action prediction (hereinafter, referred to as "action prediction information") of a sanction target player character in accordance with an action history and a current state and which includes the action prediction.

In particular, using information of (D1) and (D2), the sanction control processing unit 106 acquires information of (E1) to (E3) through analysis.

For example, when the information of (D1) and (D2) of a sanction target player character includes information indicating a small number of attacks and the sanction target player character being defeated in two previous match-ups, the sanction control processing unit 106 provides this information as information related to a reason for defeat, and provides information describing that equipment which increases the number of attacks is essential when matching-up with the sanction target player character as information on a method of attack.

In addition, for example, when the information of (D1) and (D2) of a sanction target player character includes information indicating that, four times every week, the sanction target player character moves from point A to point B in the morning, the sanction control processing unit 106 provides action prediction information indicating that there is a possibility of the sanction target player character making an appearance between point A and point B next morning.

Furthermore, the sanction control processing unit 106 generates display data for displaying action history information similar to that described above together with coordinate information on a main game screen displaying the inside of a game space in which player characters move, and provides the terminal 20 concerned with the generated display data.

Moreover, the sanction control processing unit 106 generates display data for displaying action history information similar to that described above together with coordinate information on a sub-game screen on which is displayed a map of the game space or a radar for observing the game space separately from the main game screen displaying the inside of the game space, and provides the terminal 20 concerned with the generated display data.

4.4.7. Display Mode of Player-Related Information

As a general rule, while the sanction control processing unit 106 provides a terminal concerned with player-related information to be always displayable on unless cancelling of the sanction control processing as described later is executed, the sanction control processing unit 106 may provide player-related information so as to be displayable in display modes that differ from each other in terms of display period or display interval in accordance with a level of the sanction target player or a provision target player provided with the player-related information, presence or absence of items, or the like.

In other words, the sanction control processing unit 106 provides the terminal 20 concerned with display change control information for changing a display mode in which the provided player-related information is to be displayed, together with the player-related information, in accordance with information included in the player-related information of a sanction target player or a provision target player.

In particular, for example, information included in player-related information of a sanction target player or a provision target player includes the following:

(M1) a level of a player;
(M2) an item in the possession of the player;
(M3) characteristics or attributes of the player; and
(M4) a state of a player character of the player (in particular, a state of a player character of a sanction target player in a state of mimicry, an unrecognizable state, or the like).

In addition, the sanction control processing unit 106 provides player-related information in different display modes such as a display period (a period from a display start timing to a display end timing), a display interval (when repetitively displayed at predetermined time intervals), display characteristics (for example, a presence or absence of highlighting, or a display size or a display color) or the like in accordance with a level or the like of a sanction target player or a provision target player.

4.5. Cancelling of Sanction Control Processing Including Cancelling Determination Processing Next, cancelling of sanction control processing including cancelling determination processing according to the embodiment described above will be described.

The determination processing unit 105 executes, when a sanction is imposed on a sanction target player, cancelling determination processing of determining whether or not at least either one of a state and an action after the sanction of a player character who is an operation target of the sanction target player satisfies a given cancelling condition.

In addition, when a sanction is being imposed on the sanction target player and it is determined by the cancelling determination processing that the given cancelling condition is satisfied, the sanction control processing unit 106 cancels the sanction control processing being executed with respect to the sanction target player.

In particular, as the given cancelling condition, the determination processing unit 105 determines that:

(A1) a sanction target player engages in a match-up with another player or wins the match-up;
(A2) a sanction target player comes into contact with another player by launching an attack on another player or coming under attack from another player;
(A3) when the sanction determination processing is repetitively executed every certain time, a latest sanction determination processing indicates that a sanction condition is no longer satisfied;

(A4) a position of a sanction target player character in a game space is continuously displayed in a display region of an item such as a radar or a map provided separately from the game space during a given period (for example, one minute) after invocation of a sanction condition; or (A5) two or more cancelling requirements of (A1) to (A4).

In addition, as the cancelling of the sanction control processing, the sanction control processing unit 106 executes control for hiding player-related information being displayed by the terminal 20 concerned.

For example, the sanction control processing unit 106 suspends generation of image data for having the terminal 20 concerned display the player-related information.

It should be noted that "come into contact" is not considered a requirement until the sanction target player character actually sustains an attack or sustains damage due to the attack, and an occurrence of an attack in a vicinity (for example, within a 10 m-radius) of the sanction target player character need only be detected.

In addition, instead of the cancelling conditions being satisfied, the determination processing unit 105 may cancel the sanction control processing being executed with respect to the sanction target player when a period set in advance (for example, five minutes) passes from a start of the sanction.

Furthermore, in this case, the sanction control processing unit 106 may execute control for displaying time remaining until cancelling of the sanction on the terminal of the sanction target player or the terminal 20 of a provision target player.

4.6. Modifications

Next, modifications of the sanction control processing including sanction determination processing according to the embodiment described above will be described.

4.6.1 Modification 1: When Specially Displaying (Aim-Assisting) Player-Related Information When a sanction target player character of a sanction target player is to be visualized on the terminal 20 concerned, the sanction control processing unit 106 may provide the terminal 20 with special display control information for specially displaying the sanction target player character together with player-related information.

Specifically, when providing the terminal 20 concerned with the player-related information, the sanction control processing unit 106 may generate, in conjunction with the information providing unit 110, image data for specially displaying (aim-assisting) the player-related information in a predetermined area in a main screen on which a game space is being visualized when a sanction target player character of a sanction target player to be displayed is captured within a field of view of a self-player character of the provision target player (within the game space as viewed from a virtual camera when the virtual camera is arranged at a perspective of the player character of the provision target player).

Specifically, in this case, as the special display, the sanction control processing unit 106 generates image data for:

(A1) displaying the sanction target player character in a changed display size (for example, five times a normal size) at a position where the sanction target player character is present in a main screen on which the game space has been visualized; or (A2) forming a new window at a position where the sanction target player character is present in a main screen and displaying (zoom-displaying) an enlargement of the sanction target player character having a required size or a part of the sanction target player character inside the window.

In addition, when the specially-displayed player character is selected on the terminal 20 concerned, the sanction control processing unit 106 may provide the terminal 20 with special display control information including operation control information for improving operability of a player provided with the special display control information for performing a match-up with the sanction target player character.

For example, as operation control information, the sanction control processing unit 106 may provide the terminal 20 concerned with:

(B1) control information for automatically locking-on to a specially displayed sanction target player character as a target;

(B2) control information for enlarging a determination area of a hit check (whether or not an attack has hit a target) than normal when launching an attack on the specially displayed sanction target player character; or (B3) control information for controlling a physical behavior in a game space so that, in the case of an attack using a weapon, a hit probability of a mobile body for attacking a sanction target player character such as a homing projectile is increased.

In particular, when executing a lock-on, the sanction control processing unit 106 executes lock-on processing in conjunction with the lock-on processing unit (not shown) of the terminal 20 concerned in which crosshairs are automatically trained on a position where the sanction target player character is arranged and a sanction target player character concerned is selected (specifically, a selection for attack) while displaying an image of the crosshairs (reticle) (hereinafter, referred to as a "crosshair image").

4.6.2. Sanction Control Processing Including Sanction Determination Processing in Case of Match-Up Between Teams When executing a match-up game for each group (in other words, each team) constituted by a plurality of players, the sanction control processing unit 106 may:

(C1) apply the sanction determination processing based on an action or a state of a determination target player character of each player belonging to the team; or (C2) tabulate respective determination results of each group and determine a player belonging to the group (in other words, the entire group) as a sanction target player in accordance with a tabulation result (for example, giving a predetermined number of points to each sanction target player and adding up the points for the entire group).

In particular, when (C2) tabulating determination results for each group to determine a sanction target player, the sanction control processing unit 106 may determine the following as a sanction target player:

(C2-1) all players belonging to the group;

(C2-2) players (some players having a predetermined record such as a highest or a lowest record within the group);

(C2-3) a player having a greatest impact on a determination result; or (C2-4) a player with lowest life energy.

5. Operations

Next, operations of sanction control processing including sanction determination processing and sanction-cancelling determination processing executed by the server 10 will be described with reference to FIG. 11.

Figure 11:
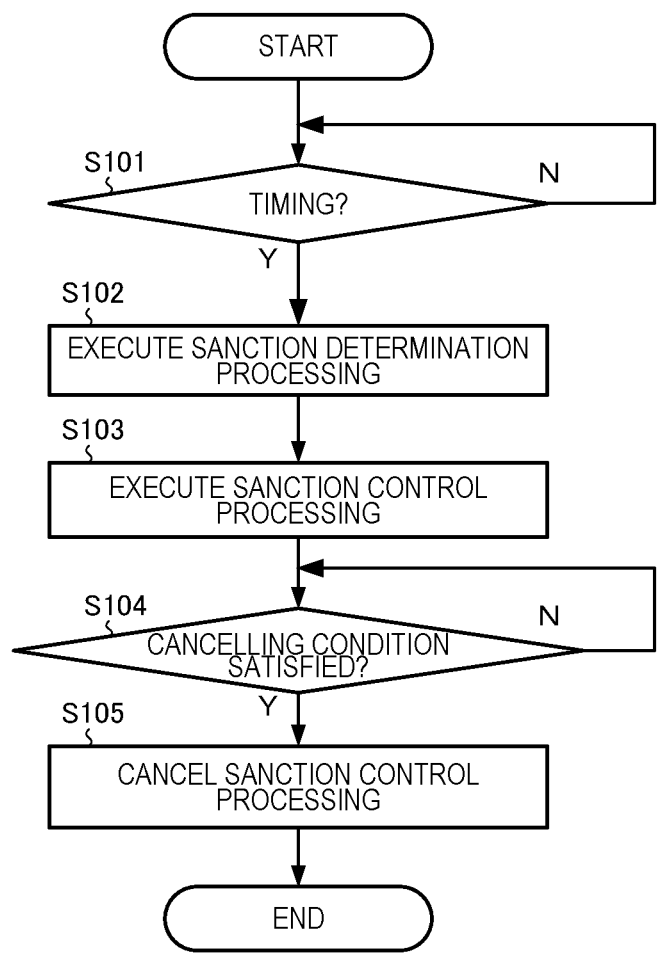
FIG. 11 is a flow chart illustrating operations of sanction control processing including sanction determination processing and sanction-cancelling determination processing which is executed by a server according to an embodiment of the invention.

FIG. 11 is a flow chart illustrating operations of the sanction control processing including sanction determination processing and sanction-cancelling determination processing executed by the server 10.

It is assumed that, in the operations, player-related information as necessary variable information of each player has already been registered in the player information storage unit 146 and is updated from time to time.

In particular, in the operations, it is assumed that player-related information which is stored in the player information storage unit 146 for each player and which at least includes either one of state information indicating a state and action information indicating an action during a game of a player character operated by each player is being managed in an appropriate manner.

In addition, the operations will be described using a match-up game based on match-ups between individuals, and it is assumed that the match-up game is already being executed and that the operations are to be executed by each player.

First, when the determination processing unit 105 detects a sanction determination timing such as a timing set in advance (a predetermined event occurrence timing that is every predetermined period such as every 10 minutes, a timing where one player character has been defeated, or the like) during the game (step S101), the determination processing unit 105 executes sanction determination processing of determining whether or not at least either one of a state and an action of a determination target player character of a player concerned satisfies a given sanction condition (step S102).

At this point, the determination processing unit 105 ends the operations when it is determined that the determination target player character of the player concerned does not satisfy the sanction condition, but makes a transition to the processing of step S103 when it is determined that the determination target player character of the player concerned satisfies the sanction condition.

Next, when it is determined that the determination target player character of the player concerned satisfies the sanction condition, the sanction control processing unit 106 specifies the player as a sanction target player and, at the same time, starts sanction control processing of providing an terminal 20 concerned with player-related information of the sanction target player as the sanction (step S103).

It should be noted that the sanction control processing unit 106 continues to provide the terminal 20 concerned with the player-related information of the sanction target player until a determination is made that the sanction control processing is to be canceled.

Next, the determination processing unit 105 determines whether or not at least either one of a state and an action after the sanction of the sanction target player character concerned satisfies a given cancelling condition (step S104), and when it is determined that the sanction target player character concerned satisfies the given cancelling condition, cancels the sanction control processing being executed (step S105) and ends the operations.

6. Other

The invention is not limited to the embodiments described above and various modifications can be made thereto. For example, any term cited with a different term having a broader meaning than or the same meaning as the term at least once in the description or the drawings may be replaced by the different term in any place in the description or the drawings.

While the embodiments described above are explained using a match-up game, the embodiments described above can also be used in other games such as an RPG and a simulation game.

In addition, in the embodiments described above, terminals 20 may be provided with each game by a single server 10 or a plurality of servers 10 may operate in conjunction with one another to construct a server system to provide the terminals with each game.

Furthermore, while a game provided by the server 10 is being executed by the terminal 20 in the embodiments described above, the game described above may be realized by having the server 10 execute each function of the processing unit 200 of the terminal 20 with the exception of operation input and execute a game program and having the terminal 20 execute operation input and image display by streaming.

In addition, the embodiments described above may be realized by a single game apparatus having the functions of the server 10 or, in other words, an apparatus (stand-alone) which operates independently without relying on other devices such as a server and, in this case, a plurality of input terminals need only be available.

Furthermore, such a game terminal may be connected in plurality in a wired or wireless manner, and a single game apparatus can be realized by a plurality of game apparatuses to function as the server 10.

Moreover, while the game system according to the invention is applied to the server 10 which executes the game system in conjunction with the terminal 20 via a network in the embodiments described above, the game system can also be applied as a tablet-type information terminal, a personal computer, or a game apparatus installed at an amusement park.

The invention includes configurations that are substantially the same (for example, in function, method, and results, or in objective and effects) as the configurations described in the embodiments. The invention also includes configurations in which non-essential elements described in the embodiments are replaced by other elements. The invention also includes configurations having the same effects as those of the configurations described in the embodiments, or configurations capable of achieving the same objectives as those of the configurations described in the embodiments. The invention further includes configurations obtained by adding known art to the configurations described in the embodiments.

Some embodiments of the invention have been described in detail above, but a person skilled in the art will readily appreciate that various modifications can be made from the embodiments without materially departing from the novel teachings and effects of the invention. Accordingly, all such modifications are assumed to be included in the scope of the invention.

What is claimed is:

1. A game system which executes a match-up game between players using a plurality of player characters in a game field formed in a virtual space and which provides a terminal with information related to the match-up game, the game system comprising a processor programmed to:

manage, during a game, player-related information which is related to each player and stored in a storage for each player and which at least includes either one of state information indicating a state and action information indicating an action during the game of a player character operated by each player;

execute, for each player or for each group constituted by a plurality of players, sanction determination processing of determining whether or not to impose a sanction as a sanction target player on the player concerned based on at least either one of a state and an action of a determination target player character to be a determination target, the determination target player character being an operation target of the player concerned; and execute, when it is determined by the sanction determination processing that the sanction is to be imposed on the player who is a determination target as the sanction target player, sanction control processing of providing player-related information of the sanction target player to (i) a terminal owned by a player who fights against the sanction target player or to (ii) a terminal owned by a player who belongs to a group that fights against a group to which the sanction target player belongs as the sanction, in order to disadvantage the sanction target player, wherein the player-related information of the sanction target player includes coordinate information that at least includes coordinates of the player character of the sanction target player in the virtual space or state information indicating a state of the player character of the sanction target player.

2. The game system according to claim 1, wherein
the processor is programmed to:
determine, for each player or for each group, whether or not at least either one of a state and an action of a determination target player character to be a determination target of the player concerned satisfies a given sanction condition for imposing the sanction, and
execute the sanction determination processing of determining to impose the sanction on the player who is the determination target when at least either one of the state and the action of the determination target player character satisfies the given sanction condition.

3. The game system according to claim 2, wherein
the given sanction condition includes a condition related to a period for detecting the state or the action of the determination target player character.

4. The game system according to claim 2, wherein
the given sanction condition includes a condition defined based on coordinate information indicating coordinates in the virtual space of the determination target player character.

5. The game system according to claim 1, wherein
the processor is programmed to cancel, when the sanction is being imposed on the sanction target player, the sanction control processing being executed with respect to the sanction target player when a period set in advance passes from a start of the sanction.

6. The game system according to claim 1, wherein
the player-related information includes:
(1) action history-related information at least including action history information indicating a history of actions of the player character of the sanction target player; or
(2) action prediction-related information at least including action prediction information of the player character having been analyzed based on the action history information.

7. The game system according to claim 1, wherein,
when the determination target player character is in an unrecognizable state where the determination target player character cannot be recognized by other players or the determination target player character is in a camouflaged state where the determination target player character is camouflaged as a given object in the virtual space and when the player operating the determination target player character is the sanction target player, the player related information includes information for displaying a disabled state where the unrecognizable state or the camouflaged state of the determination target player character has been disabled.

8. The game system according to claim 1, wherein
the processor is programmed to provides the terminal concerned with display change control information for changing a display mode in which the provided player-related information is to be displayed, together with the player-related information, in accordance with information included in the player-related information of the sanction target player or a provision target player to which the player-related information has been provided.

9. A game system which executes a match-up game between players using a plurality of player characters in a game field formed in a virtual space and which provides a terminal with information related to the match-up game, the game system comprising a processor programmed to:

manage, during a game, player-related information which is related to each player and stored in a storage for each player and which at least includes either one of state information indicating a state and action information indicating an action during the game of a player character operated by each player;

execute, for each player or for each group constituted by a plurality of players, sanction determination processing of determining whether or not to impose a sanction as a sanction target player on the player concerned based on at least either one of a state and an action of a determination target player character to be a determination target, the determination target player character being an operation target of the player concerned; and execute, when it is determined by the sanction determination processing that the sanction is to be imposed on the player who is a determination target as the sanction target player, sanction control processing of providing player-related information of the sanction target player to a terminal owned by a player who is not the sanction target player or to a terminal owned by a player who belongs to a group that differs from a group to which the sanction target player belongs as the sanction, wherein the processor is programmed to:
execute, when the sanction is being imposed on the sanction target player, cancelling determination processing of determining whether or not at least either one of a state and an action after the sanction of a player character who is an operation target of the sanction target player satisfies a given cancelling condition, and
cancel, when the sanction is being imposed on the sanction target player and it is determined by the cancelling determination processing that the given cancelling condition is satisfied, the sanction control processing being executed with respect to the sanction target player.

10. A game system which executes a match-up game between players using a plurality of player characters in a game field formed in a virtual space and which provides a terminal with information related to the match-up game, the game system comprising a processor programmed to:

manage, during a game, player-related information which is related to each player and stored in a storage for each player and which at least includes either one of state information indicating a state and action information indicating an action during the game of a player character operated by each player;

execute, for each player or for each group constituted by a plurality of players, sanction determination processing of determining whether or not to impose a sanction as a sanction target player on the player concerned based on at least either one of a state and an action of a determination target player character to be a determination target, the determination target player character being an operation target of the player concerned; and execute, when it is determined by the sanction determination processing that the sanction is to be imposed on the player who is a determination target as the sanction target player, sanction control processing of providing player-related information of the sanction target player to a terminal owned by a player who is not the sanction target player or to a terminal owned by a player who belongs to a group that differs from a group to which the sanction target player belongs as the sanction, wherein the player-related information includes position information that at least includes a position of the player character of the sanction target player in the virtual space.

11. A game system which executes a match-up game between players using a plurality of player characters in a game field formed in a virtual space and which provides a terminal with information related to the match-up game, the game system comprising a processor programmed to:

manage, during a game, player-related information which is related to each player and stored in a storage for each player and which at least includes either one of state information indicating a state and action information indicating an action during the game of a player character operated by each player;

execute, for each player or for each group constituted by a plurality of players, sanction determination processing of determining whether or not to impose a sanction as a sanction target player on the player concerned based on at least either one of a state and an action of a determination target player character to be a determination target, the determination target player character being an operation target of the player concerned; and execute, when it is determined by the sanction determination processing that the sanction is to be imposed on the player who is a determination target as the sanction target player, sanction control processing of providing player-related information of the sanction target player to a terminal owned by a player who is not the sanction target player or to a terminal owned by a player who belongs to a group that differs from a group to which the sanction target player belongs as the sanction, wherein the processor is programmed to provide the terminal with, when the player character of the sanction target player is to be visualized on the terminal concerned, special display control information for specially displaying the player character together with the player-related information.

12. The game system according to claim 11, wherein the special display control information includes operation control information for improving operability of the player provided with the special display control information for performing a match-up with the specially-displayed player character when the specially-displayed player character has been selected.

13. A method of executing a match-up game between players using a plurality of player characters in a game field formed in a virtual space and providing a terminal with information related to the match-up game, the method comprising:

managing, during a game, player-related information which is related to each player and stored in a storage for each player and which at least includes either one of state information indicating a state and action information indicating an action during the game of a player character operated by each player;

executing, for each player or for each group constituted by a plurality of players, sanction determination processing of determining whether or not to impose a sanction as a sanction target player on a player concerned based on at least either one of a state and an action of a determination target player character to be a determination target, the determination target player character being an operation target of the player concerned; and executing, when it is determined by the sanction determination processing that a sanction is to be imposed on the player who is a determination target as a sanction target player, sanction control processing of providing player-related information of the sanction target player to (i) a terminal owned by a player who fights against the sanction target player or to (ii) a terminal owned by a player who belongs to a group that fights against a group to which the sanction target player belongs as the sanction, in order to disadvantage the sanction target player, wherein the player-related information of the sanction target player includes coordinate information that at least includes coordinates of the player character of the sanction target player in the virtual space or state information indicating a state of the player character of the sanction target player.

14. A game system which executes a match-up game between players using a plurality of player characters in a game field formed in a virtual space, the game system comprising a processor programmed to:

manage, during a game, player-related information which is related to each player and stored in a storage for each player and which at least includes either one of state information indicating a state and action information indicating an action during the game of a player character operated by each player;

execute, for each player or for each group constituted by a plurality of players, sanction determination processing of determining whether or not to impose a sanction as a sanction target player on a player concerned based on at least either one of a state and an action of a determination target player character to be a determination target, the determination target player character being an operation target of the player concerned; and display, when it is determined by the sanction determination processing that a sanction is to be imposed on the player who is a determination target as a sanction target player, player-related information of the sanction target player on display means used by another player who fights against the sanction target player as the sanction, in order to disadvantage the sanction target player, wherein the player-related information of the sanction target player includes coordinate information that at least includes coordinates of the player character of the sanction target player in the virtual space or state information indicating a state of the player character of the sanction target player.

15. A method of executing a match-up game between players using a plurality of player characters in a game field formed in a virtual space, the method comprising:

managing, during a game, player-related information which is related to each player and stored in a storage for each player and which at least includes either one of state information indicating a state and action information indicating an action during the game of a player character operated by each player;

executing, for each player or for each group constituted by a plurality of players, sanction determination processing of determining whether or not to impose a sanction as a sanction target player on a player concerned based on at least either one of a state and an action of a determination target player character to be a determination target, the determination target player character being an operation target of the player concerned; and displaying, when it is determined by the sanction determination processing that a sanction is to be imposed on the player who is a determination target as a sanction target player, player-related information of the sanction target player on display means used by another player who fights against the sanction target player as the sanction, in order to disadvantage the sanction target player, wherein the player-related information of the sanction target player includes coordinate information that at least includes coordinates of the player character of the sanction target player in the virtual space or state information indicating a state of the player character of the sanction target player.

\* \* \* \* \*